(12) United States Patent
Ha et al.

(10) Patent No.: US 11,822,728 B2
(45) Date of Patent: Nov. 21, 2023

(54) ELECTRONIC DEVICE AND OPERATION METHOD THEREOF

(71) Applicant: SAMSUNG ELECTRONICS CO., LTD., Suwon-si (KR)

(72) Inventors: Heonjun Ha, Suwon-si (KR);
Seungnyun Kim, Suwon-si (KR);
Junwhon Uhm, Suwon-si (KR);
Jinchoul Lee, Suwon-si (KR);
Hyunsoo Kim, Suwon-si (KR);
Hyunjun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/457,980

(22) Filed: Dec. 7, 2021

(65) Prior Publication Data
US 2022/0197394 A1    Jun. 23, 2022

Related U.S. Application Data

(63) Continuation of application No. PCT/KR2021/016257, filed on Nov. 9, 2021.

(30) Foreign Application Priority Data

Dec. 17, 2020   (KR) .......................... 10-2020-0177194

(51) Int. Cl.
*G06F 3/0482* (2013.01)
*G06F 3/0346* (2013.01)
(Continued)

(52) U.S. Cl.
CPC .......... *G06F 3/017* (2013.01); *G02B 27/0093* (2013.01); *G02B 27/0101* (2013.01);
(Continued)

(58) Field of Classification Search
CPC .......... G06F 3/017; G06F 3/012; G06F 3/013; G06F 3/016; G06F 3/04815;
(Continued)

(56) References Cited

U.S. PATENT DOCUMENTS 8,935,637 B2 *  1/2015  Kim ..................... G06F 3/0414
                                                715/863
8,941,560 B2    1/2015  Wong et al.
(Continued)

FOREIGN PATENT DOCUMENTS

CN     105573500 A     5/2016
JP       6765846 B2   10/2020
(Continued)

OTHER PUBLICATIONS

International Search Report dated Feb. 25, 2022 for PCT/KR2021/016257.

*Primary Examiner* — Jordany Nunez
(74) *Attorney, Agent, or Firm* — Nixon & Vanderhye P.C.

(57) ABSTRACT

An electronic device may include a display, a communication circuit, at least one camera, a memory, and a processor operatively connected to the display, the communication circuit, the at least one camera, and the memory. The memory may store instructions that, when executed, cause the processor to provide an augmented reality (AR) environment or a virtual reality (VR) environment through the display, connect the electronic device and at least one external electronic device through the communication circuit, display the at least one external electronic device through the display, specify a first external electronic device among the displayed at least one external electronic device based on an input interface switching event, and control an operation of the electronic device in the augmented reality
(Continued)

environment or the virtual reality environment using the specified first external electronic device.

20 Claims, 12 Drawing Sheets

(51) Int. Cl.
| | |
|---|---|
| G06F 3/0488 | (2022.01) |
| G06F 3/01 | (2006.01) |
| G06F 3/04815 | (2022.01) |
| G06F 3/0485 | (2022.01) |
| G06F 3/16 | (2006.01) |
| G06V 40/20 | (2022.01) |
| G06V 40/10 | (2022.01) |
| G02B 27/00 | (2006.01) |
| G02B 27/01 | (2006.01) |
| G06T 19/00 | (2011.01) |

(52) U.S. Cl.
CPC .......... *G02B 27/017* (2013.01); *G06F 3/012* (2013.01); *G06F 3/013* (2013.01); *G06F 3/016* (2013.01); *G06F 3/0485* (2013.01); *G06F 3/0488* (2013.01); *G06F 3/04815* (2013.01); *G06F 3/16* (2013.01); *G06T 19/006* (2013.01); *G06V 40/10* (2022.01); *G06V 40/20* (2022.01); *G02B 2027/0138* (2013.01)

(58) Field of Classification Search
CPC ........ G06F 3/0485; G06F 3/0488; G06F 3/16; G06F 3/0304; G06F 3/04812; G06F 3/165; G02B 27/0093; G02B 27/0101; G02B 27/017; G02B 2027/0138; G02B 2027/014; G06T 19/006; G06V 40/10; G06V 40/20; G06V 40/18

See application file for complete search history.

(56) References Cited

U.S. PATENT DOCUMENTS

| | | | | |
|---|---|---|---|---|
| 9,575,589 | B2* | 2/2017 | Jeon | G06F 3/017 |
| 9,678,654 | B2 | 6/2017 | Wong et al. | |
| 10,101,803 | B2 | 10/2018 | Faaborg et al. | |
| 10,237,509 | B1 | 3/2019 | Kim et al. | |
| 10,289,376 | B2* | 5/2019 | Baek | G06T 19/006 |
| 10,412,334 | B2 | 9/2019 | Kim et al. | |
| 10,438,389 | B2* | 10/2019 | Feng | G06F 3/0304 |
| 10,468,022 | B2* | 11/2019 | Min | G06F 3/167 |
| 10,509,487 | B2 | 12/2019 | Dearman et al. | |
| 10,606,344 | B2 | 3/2020 | Faaborg et al. | |
| 10,814,220 | B2* | 10/2020 | Moon | G06F 3/04845 |
| 11,086,581 | B2 | 8/2021 | Stoyles et al. | |
| 11,188,286 | B2 | 11/2021 | Stoyles et al. | |
| 11,199,709 | B2 | 12/2021 | Son et al. | |
| 11,467,403 | B2* | 10/2022 | Chang | G02B 27/0093 |
| 11,493,989 | B2* | 11/2022 | Speelman | G06F 3/016 |
| 11,533,192 | B2* | 12/2022 | Bradley | H04L 12/2829 |
| 2006/0241792 | A1* | 10/2006 | Pretlove | G06Q 50/00 |
| | | | | 700/83 |
| 2011/0304648 | A1* | 12/2011 | Kim | G06F 3/016 |
| | | | | 345/633 |
| 2012/0124509 | A1* | 5/2012 | Matsuda | G06T 19/20 |
| | | | | 715/782 |
| 2013/0265330 | A1* | 10/2013 | Goto | G02B 27/0172 |
| | | | | 345/632 |
| 2014/0028713 | A1* | 1/2014 | Keating | G06F 3/01 |
| | | | | 345/633 |
| 2014/0071164 | A1* | 3/2014 | Saklatvala | G06F 3/04842 |
| | | | | 345/633 |
| 2014/0237366 | A1* | 8/2014 | Poulos | G06F 3/013 |
| | | | | 715/728 |
| 2015/0067580 | A1* | 3/2015 | Um | G06F 3/0481 |
| | | | | 715/781 |
| 2015/0156028 | A1* | 6/2015 | Ballard | G06F 3/0484 |
| | | | | 709/204 |
| 2016/0133052 | A1* | 5/2016 | Choi | G06F 3/011 |
| | | | | 345/633 |
| 2016/0196692 | A1* | 7/2016 | Kjallstrom | G06F 3/011 |
| | | | | 345/633 |
| 2017/0060230 | A1* | 3/2017 | Faaborg | G06F 3/04883 |
| 2017/0109936 | A1* | 4/2017 | Powderly | G06F 3/0482 |
| 2017/0329419 | A1 | 11/2017 | Dearman et al. | |
| 2017/0329488 | A1* | 11/2017 | Welker | G06F 3/04842 |
| 2019/0011979 | A1 | 1/2019 | Faaborg et al. | |
| 2019/0060742 | A1* | 2/2019 | Moon | G06F 3/014 |
| 2019/0079599 | A1* | 3/2019 | Lee | G06F 3/0346 |
| 2019/0129607 | A1* | 5/2019 | Saurabh | G06F 3/011 |
| 2019/0174088 | A1 | 6/2019 | Kim et al. | |
| 2019/0114837 | A1 | 8/2019 | Jeong et al. | |
| 2020/0150435 | A1* | 5/2020 | Rodriguez, II | G06F 3/0304 |
| 2020/0192486 | A1* | 6/2020 | Schoessler | G06F 3/0346 |
| 2020/0258481 | A1* | 8/2020 | Woo | G09G 5/14 |
| 2020/0264694 | A1* | 8/2020 | Yakishyn | G06F 3/04842 |
| 2020/0275089 | A1 | 8/2020 | Lee et al. | |
| 2021/0141444 | A1* | 5/2021 | Speelman | G06F 3/011 |
| 2021/0358294 | A1* | 11/2021 | Parashar | G08C 17/02 |
| 2022/0057634 | A1* | 2/2022 | Chang | G02B 27/0093 |
| 2023/0034657 | A1* | 2/2023 | Speelman | G06F 3/013 |

FOREIGN PATENT DOCUMENTS

| | | |
|---|---|---|
| KR | 10-2012-0133648 | 12/2012 |
| KR | 2018-0059191 A | 6/2018 |
| KR | 2019-0041069 A | 4/2019 |
| KR | 2020-0102228 A | 8/2020 |

* cited by examiner

ELECTRONIC DEVICE AND OPERATION METHOD THEREOF

CROSS-REFERENCE TO RELATED APPLICATIONS

This application is a continuation of International Application No. PCT/KR2021/016257 designating the United States, filed on Nov. 9, 2021, in the Korean Intellectual Property Receiving Office and claiming priority to Korean Patent Application No. 10-2020-0177194 filed Dec. 17, 2020, the disclosures of which are incorporated by reference herein in their entireties.

BACKGROUND

Field

Various embodiments disclosed in the disclosure are related to an electronic device and an operation method of the electronic device.

Description of Related Art

Augmented reality (AR) is a technology for superimposing and displaying virtual information on a real video displayed on a display of an electronic device. Virtual reality (VR) is a technology for displaying the virtual information and/or a pre-captured preview image on the display of the electronic device.

As a wearable device, for example, a head mounted display (HMD) is developed, the electronic device may recognize an external environment of a user and provide the user with an augmented reality environment reflecting the recognized external environment.

An electronic device that provides an augmented reality environment and/or a virtual reality environment may receive an input using a gesture, but may lack an element for a more intuitive input experience such as tactile feedback. In addition, the electronic device may have difficulty in recognizing an input intention of a user merely by the gesture in space. In addition, when the electronic device uses a camera for identifying the gesture, the gesture in a blind spot of an angle of view of the camera may not be identified.

SUMMARY

Various example embodiments disclosed in the disclosure are to provide an electronic device that intuitively provides at least a portion of an input method/technique using a gesture of the electronic device that provides an augmented reality environment and/or a virtual reality environment to an external electronic device when the augmented reality environment and/or the virtual reality environment is activated.

Various example embodiments disclosed in the disclosure are to provide an electronic device that provides a control method related to an operation of an external electronic device among a plurality of external electronic devices to another external electronic device when an augmented reality environment and/or a virtual reality environment is activated.

An electronic device according to an example embodiment may include a display, a communication circuit, at least one camera, a memory, and at least one processor operatively connected to the display, the communication circuit, the at least one camera, and the memory. According to an example embodiment, the memory stores instructions that, when executed, are configured to cause the at least one processor to provide an augmented reality (AR) environment or a virtual reality (VR) environment through the display, connect the electronic device and at least one external electronic device through the communication circuit, display the at least one external electronic device through the display, specify a first external electronic device among the displayed at least one external electronic device based on an input interface switching event, and control an operation of the electronic device in the augmented reality environment or the virtual reality environment using the specified first external electronic device.

An electronic device according to an example embodiment may include a display, a communication circuit, at least one camera, a memory, and at least one processor operatively connected to the display, the communication circuit, the at least one camera, and the memory. According to an example embodiment, the memory stores instructions that, when executed, are configured to cause the at least one processor to provide an augmented reality (AR) environment or a virtual reality (VR) environment through the display, connect the electronic device and an external electronic device through the communication circuit, display the external electronic device through the display, activate a first input mode for controlling the electronic device using a hand gesture of a user while the augmented reality environment or the virtual reality environment is provided, and activate a second input mode for controlling the electronic device using the hand gesture and the external electronic device based on reception of an input interface switching request provided by the user while the first input mode is activated.

An operation method of an electronic device according to an embodiment may include an operation of providing an augmented reality (AR) environment or a virtual reality (VR) environment through a display, an operation of connecting the electronic device and at least one external electronic device through a communication circuit, an operation of displaying the at least one external electronic device through the display, an operation of specifying a first external electronic device among the displayed at least one external electronic device based on an input interface switching event, and an operation of controlling an operation of the electronic device in the augmented reality environment or the virtual reality environment using the specified first external electronic device.

According to certain example embodiments, an electronic device that intuitively provides at least the portion of the input method using the gesture of the electronic device that provides the augmented reality environment and/or the virtual reality environment to the external electronic device may be provided.

According to certain example embodiments, an electronic device that provides the control method related to the operation of one external electronic device among the plurality of external electronic devices to another external electronic device when the augmented reality environment and/or the virtual reality environment is activated may be provided.

In addition, various effects that are directly or indirectly identified through the disclosure may be provided.

BRIEF DESCRIPTION OF THE DRAWINGS

In relation to the description of the drawings, the same or similar reference numerals may be used with respect to the same or similar elements. Additionally, the above and other aspects, features and advantages of certain embodiments will be more apparent from the following detailed description, taken in conjunction with the accompanying drawings, in which.

In connection with description of the drawings, the same or similar reference numerals may be used for the same or similar components.

Any of the embodiment described herein may be used in conjunction with any other embodiment described herein.

DETAILED DESCRIPTION

Figure 1:
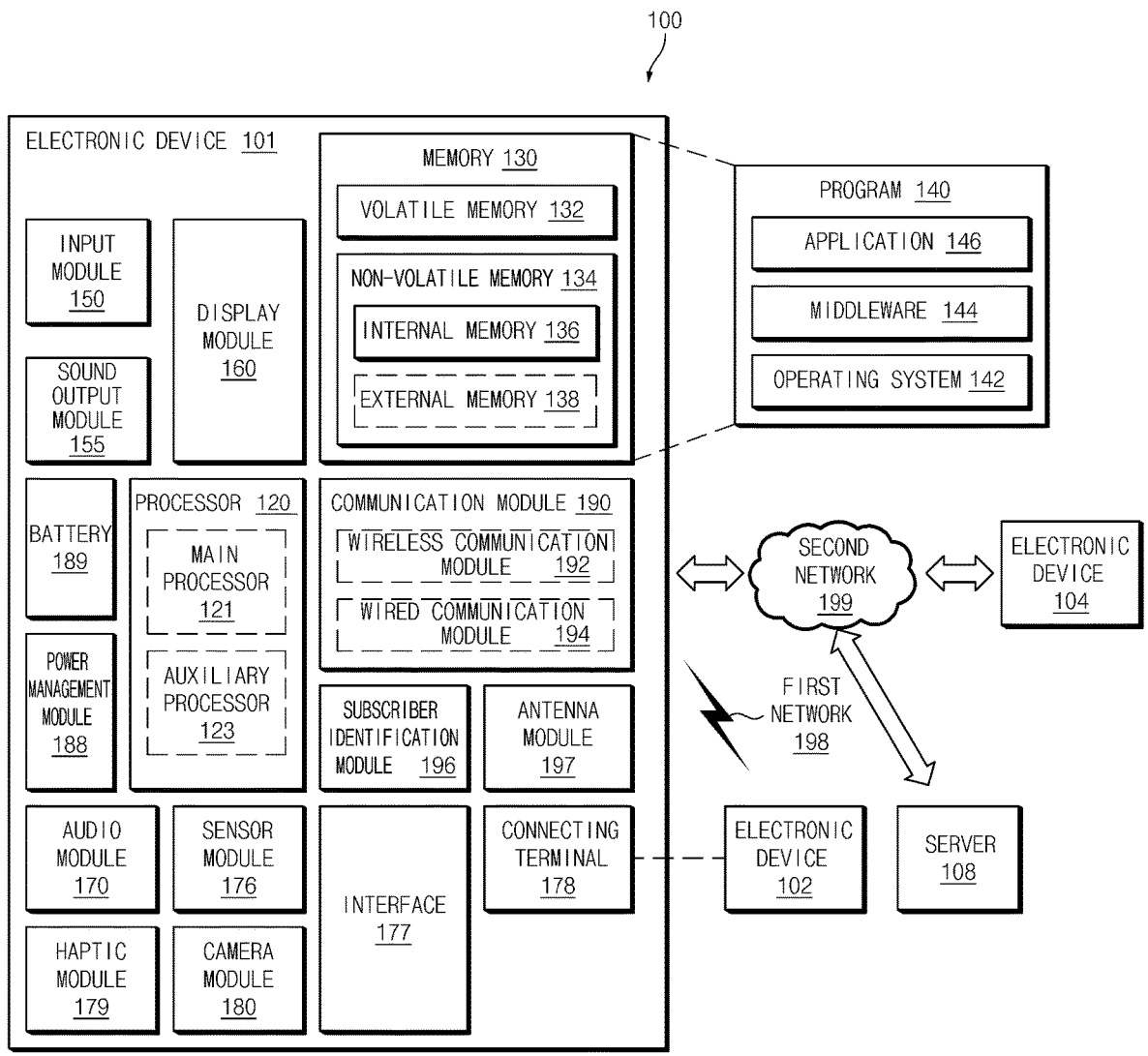
FIG. 1 is a block diagram illustrating an electronic device 101 in a network environment 100 according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
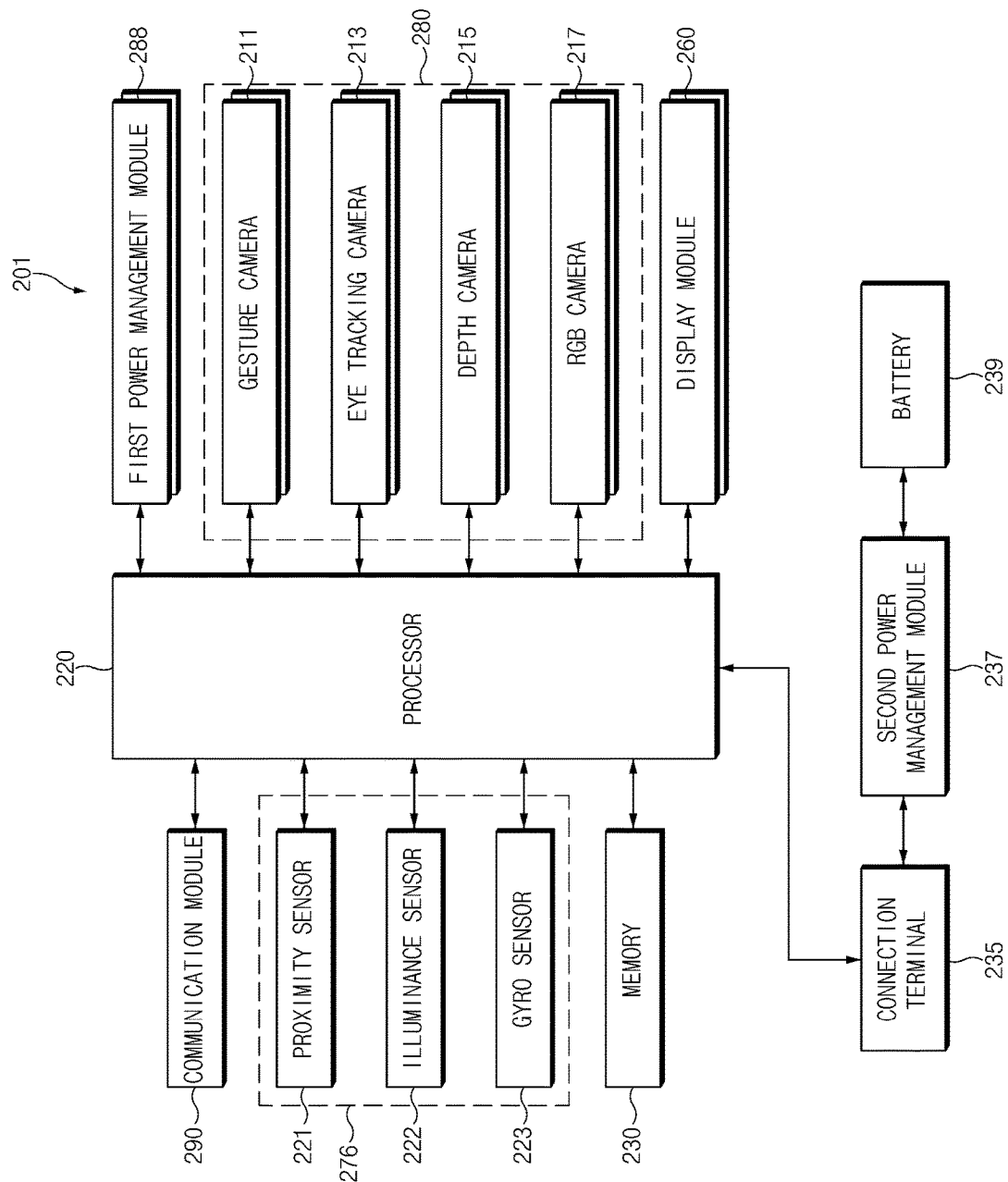
FIG. 2 is a block diagram of an electronic device, according to various example embodiments.

FIG. 2 is a block diagram of an electronic device, according to various example embodiments.

Referring to FIG. 2, an electronic device 201 (e.g., the electronic device 101 in FIG. 1) according to an embodiment may include a at least one processor 220 (e.g., the processor 120 in FIG. 1) comprising processing circuitry, a communication module 290 (e.g., the communication module 190 in FIG. 1) comprising communication circuitry, a power management module 288 (e.g., the power management module 188 in FIG. 1) comprising circuitry, a sensor module 276 (e.g., the sensor module 176 in FIG. 1) comprising at least one sensor and sensing circuitry, a camera module 280 (e.g., the camera module 180 in FIG. 1) comprising a camera, a memory 230 (e.g., the memory 130 in FIG. 1), and/or a display module 260 (e.g., the display module 160 in FIG. 1) including a display. According to an embodiment, the electronic device 201 may be connected to a second power management module 237 through a connection terminal 235 (e.g., a USB TYPE-C).

According to an example embodiment, the electronic device 201 may be a wearable device that may be worn on a body part of the user. For example, the electronic device 201 may be worn on a head of the user. For example, the display module 260 of the electronic device may include a head mounted display (HMD). Hereinafter, it may be assumed that the electronic device 201 to be described later is an electronic device that is worn on the head of the user and has the head mounted display positioned in front of eyes of the user when the electronic device is worn. A direction in which the user looks when the user is wearing the electronic device 201 may be referred to as a first direction, and a direction opposite to the first direction and toward the user may be referred to as a second direction.

According to an example embodiment, the processor 220 may execute a program (e.g., the program 140 in FIG. 1) stored in the memory 230 to control at least one other component (e.g., a hardware or software component) and perform various data processing or operations. According to an example embodiment, the processor 220 may provide an augmented reality environment (and/or an augmented reality service) to the user. The processor 220 may output, through the display module 260, at least one virtual object such that the at least one virtual object is seen by being added to a real space corresponding to a field of view of the user wearing the electronic device 201. According to an example embodiment, the processor 220 may provide a virtual reality environment (and/or a virtual reality service) to the user. The processor 220 may display a virtual image or a virtual video through the display module 260.

According to an example embodiment, content containing the at least one virtual object displayed in the real space displayed through the display module 260 may be referred to as augmented reality content. For example, the display module 260 may display the augmented reality content generated by the electronic device 201, or received from another electronic device (e.g., the electronic devices 102 and 104 in FIG. 1, or the server 108 in FIG. 1) through the communication module 290. According to an example embodiment, content displayed through the display module 260 in the virtual reality environment may be referred to as virtual reality content. For example, the processor 220 may receive the virtual reality content from another electronic device (e.g., the electronic devices 102 and 104 in FIG. 1, or the server 108 in FIG. 1).

According to an example embodiment, the display module 260 of the electronic device 201 may include at least one display panel (e.g., a first display panel and/or a second display panel). The display panel may be formed of or include transparent devices such that the user may recognize the real space through the display module 260. The display module 260 may display the at least one virtual object on at least a portion of the display panel such that the user wearing the electronic device 201 may see that the virtual object is added to the real space. For example, the field of view of the user may include an angle or a range at which the user may recognize an object. According to an example embodiment, the display module 260 of the virtual reality environment may display a preview video filmed regarding the real space.

According to an example embodiment, the sensor module 276 of the electronic device 201 may include a proximity sensor 221, an illuminance sensor 222, and/or a gyro sensor 223. According to an example embodiment, the proximity sensor 221 may sense an object adjacent to the electronic device 201. The illuminance sensor 222 may measure a degree of brightness around the electronic device 201. According to an example embodiment, the gyro sensor 223 may sense a posture and/or a position of the electronic device 201. For example, the gyro sensor 223 may sense whether the electronic device 201 is properly worn on the head of the user. As another example, the gyro sensor 223 may sense a movement of the electronic device 201 and/or the user wearing the electronic device 201.

According to an example embodiment, the electronic device 201 may perform wireless communication with another electronic device (e.g., the electronic devices 102 and 104 in FIG. 1) through the communication module 290 (e.g., a wireless communication circuit). For example, the electronic device 201 may perform the wireless communication with a portable electronic device (e.g., a smart phone), and the electronic device 201 may be at least partially controlled by another external electronic device (e.g., the portable electronic device). For example, the electronic device 201 may perform at least one function under the control of another external electronic device.

According to an example embodiment, the camera module 280 of the electronic device 201 may include at least one of a gesture camera 211, an eye tracking camera 213, a depth camera 215, and/or an RGB camera 217. According to an example embodiment, the gesture camera 211 may sense the movement of the user. For example, at least one gesture camera 211 may be disposed in the electronic device 201, and may sense a movement of a user's hand within a set distance. The gesture camera 211 may include a simultaneous localization and mapping camera (SLAM camera) for recognizing information (e.g., a position and/or a direction) related to a surrounding space of the electronic device 201. A gesture recognition region of the gesture camera 211 may be set based on a filming-available-range of the gesture camera 211. According to an example embodiment, the eye tracking camera 213 may track a movement of a left eye and/or a right eye of the user. According to an example embodiment, the processor 220 may use the eye tracking camera 213 to identify a gaze direction of the left eye and/or a gaze direction of the right eye. According to an example embodiment, the depth camera 215 may measure a distance to an object positioned in front of the electronic device 201. The depth camera 215 may include a time of flight (TOF) camera and/or a depth camera. According to an example embodiment, the electronic device 201 may recognize one of objects positioned in a gaze range (e.g., a FOV) the user is looking at using the eye tracking camera 213, and measure a distance to the corresponding object by calculating a depth through the depth camera, or through the TOF camera. According to an example embodiment, the RGB (red green blue) camera 217 may sense information related to a color of the object and information on the distance to the object. According to an example embodiment, the gesture camera 211, the eye tracking camera 213, the depth camera 215, and/or the RGB camera 217 included in the camera module 280 may be independently included in the electronic device 201, or some of those may be implemented as an integrated camera. For example, the depth camera 215 and the RGB camera 217 may be implemented as one integrated camera. According to an example embodiment, the camera module 280 may be disposed to perform the filming in the first direction at a position corresponding to the eyes of the user when the user is wearing the electronic device 201. According to an example embodiment, the camera module 280 may film a video in the direction the user looks.

According to an example embodiment, the camera module 280 may recognize an external object positioned in the gaze range of the user. For example, the external object recognized by the camera module 280 may be the body part, such as the hand of the user, or an arbitrary object.

According to an example embodiment, the camera module 280 may identify a position of the external object. For example, the camera module 280 may identify a relative position of the object with respect to the electronic device. As another example, the camera module 280 may identify a position of another external object based on one external object recognized by the camera module 280.

According to an example embodiment, the camera module 280 may identify a position of a finger of the user. For example, the camera module 280 may identify the position of the finger based on a tip (e.g., a tip of a nail) of the finger that takes a pointing operation of the hand of the user. According to an example embodiment, the processor 220 may store the identified position of the finger of the user in the memory 230. For example, the processor 220 may display virtual content (e.g., a dot or a finger icon) on the tip (e.g., the tip of the nail) of the finger of the user recognized on the augmented reality content for easy identification of the user.

According to an example embodiment, the power management module 288 and 237 may manage power supplied to the electronic device 201. The power management module 288 and 237 may include the first power management module 288 that is directly connected to the processor 220 to supply the power, and/or the second power management module 237 that supplies the power through the connection terminal 235 (e.g., the TYPE-C). The second power management module 237 may be functionally connected to a battery 239 to manage power of a greater amount. According to an example embodiment, the electronic device 201 may drive at least one camera included in the camera module 280 using the power supplied from the power management module 288 and 237. The electronic device 201 may manage the consumed power by adjusting display information provided through the display module 260 based on information acquired using the at least one camera. The number and a position of at least one camera (e.g., the gesture camera 211, the eye tracking camera 213, the depth camera 215, and/or the RGB camera 217) included in the electronic device 201 shown in FIG. 2 are not limited. For example, the number and the position of at least one camera may vary based on a shape (e.g., a form or a size) of the electronic device 201.

According to an example embodiment, the processor 220 may provide information on a selected object to the user through the display module 260 in response to a selection input of the user for the real object sensed through the camera module 280 or the virtual object. An operation performed by the processor 220 of the electronic device 201 according to an embodiment will be described with reference to the drawings to be described later.

Figure 3:
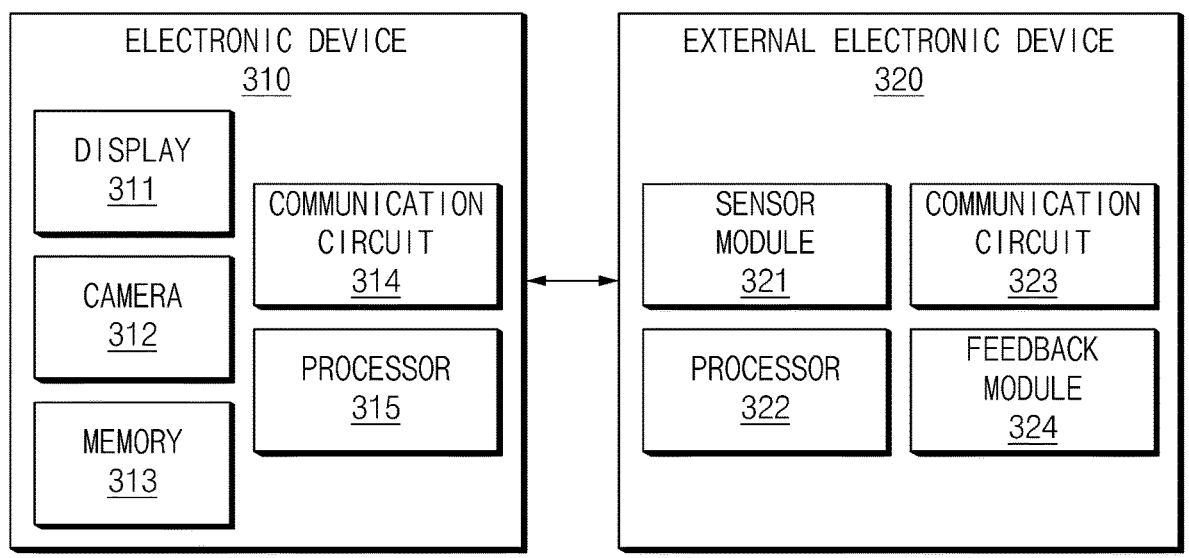
FIG. 3 is a block diagram of an electronic device and a block diagram of an external electronic device, according to various example embodiments.

FIG. 3 is a block diagram of an electronic device and a block diagram of an external electronic device, according to various example embodiments.

Any of the embodiment(s) described herein may be used in conjunction with any other embodiment(s) described herein.

Referring to FIG. 3, an electronic device 310 (e.g., the electronic device 101 in FIG. 1 and/or the electronic device 201 in FIG. 2) may include a display 311 (e.g., the display module 160 in FIG. 1 and/or the display module 260 in FIG. 2), a camera 312 (e.g., the camera module 180 in FIG. 1 and/or the camera module 280 in FIG. 2), a memory 313 (e.g., the memory 130 in FIG. 1 and/or the memory 230 in FIG. 2), a communication circuit 314 (e.g., the communication module 190 in FIG. 1 and/or the communication module 290 in FIG. 2), and/or a processor 315 comprising processing circuitry (e.g., the processor 120 in FIG. 1 and/or the processor 220 in FIG. 2). Hereinafter, embodiments of the electronic device 310 that provides the augmented reality environment and/or the virtual reality environment will be described.

According to an example embodiment, the electronic device 310 may be a wearable device described above including the display 311 constructed to be worn on (or coupled to) the body part (e.g., the head) of the user.

According to an example embodiment, the display 311 may include the transparent devices in at least a portion thereof such that the user may recognize the real space outside the electronic device 310 through the display 311. According to an example embodiment, the display 311 may provide the augmented reality (AR) environment to the user. For example, the display 311 may include the head mounted display (HMD), and may provide the augmented reality environment to the user who is wearing the display 311 on the body part (e.g., the head). For example, when the user wears (or couples) the electronic device 310 on (or to) the head, the display 311 may provide the user with the augmented reality environment including the at least one virtual object additionally displayed on the real space. For example, when the user wears (or couples) the electronic device 310 on (or to) the head, the display 311 may display the at least one virtual object on at least a portion of the display 311 such that the user visually recognizes that the at least one virtual object is added to the real space recognized through the display 311. According to various embodiments, the display 311 may display the preview video filmed the real space in the virtual reality environment. Even in this case, embodiments to be described later may be applied.

According to an example embodiment, the camera 312 may include a first camera that recognizes the movement of the user's hand, a second camera that acquires an image corresponding to the gaze direction of the user or a direction the head is facing, and/or a third camera that recognizes the movement of the user's eyes. For example, the first camera can recognize a hand gesture of the user. For example, the second camera may recognize the gaze direction of the user or recognize a direction the head (or a neck) of the user is facing, and acquire an external image corresponding to the recognized direction. For example, the third camera may recognize (or sense) a movement of pupils of the user. As another example, the first camera or the second camera may recognize the hand gesture of the user and the gaze direction of the user or the direction the head (or the neck) of the user is facing, and recognize (or sense) an external movement corresponding to the recognized direction.

According to an example embodiment, the memory 313 may store at least one program, application, data, or instruction executed by the processor 315. According to an example embodiment, the memory 313 may include at least a portion of the memory 130 shown in FIG. 1. According to an example embodiment, the memory 313 may include information or instructions for allowing at least some of operations of the electronic device 310 to be described later to be performed. According to an example embodiment, the memory 313 may include instructions related to a plurality of applications executed by the processor 315.

According to an example embodiment, the communication circuit 314 may support communication between the electronic device 310 and an external electronic device 320. For example, the communication circuit 314 may allow the electronic device 310 to communicate with the external electronic device 320. For example, the communication circuit 314 may connect the electronic device 310 and the external electronic device 320 to each other in a wireless communication scheme (e.g., a Bluetooth, a WiFi, and a 5G communication scheme). For example, the communication circuit 314 may provide (or transmit) a control signal (e.g., an electrical and/or electronic signal) for controlling the operation of the electronic device 310 to the external electronic device 320. For example, the communication circuit 314 may transmit and receive the control signal (e.g., the electrical and/or electronic signal) for controlling the operation of the electronic device 310 with the external electronic device 320 in the wireless communication scheme (e.g., the Bluetooth, the WiFi, and the 5G communication scheme). In various embodiments, the communication circuit 314 may connect the electronic device 310 to a plurality of external electronic devices.

According to an example embodiment, the at least one processor 315 may transfer (or handover or provide) an authority to control the electronic device 310 to the external electronic device 320 in the augmented reality environment. According to an example embodiment, the processor 315 may recognize an input interface switching event. For example, the processor 315 may recognize the input interface switching event when a gesture (e.g., the hand gesture, and/or the gaze) of the user points the external electronic device 320. For example, the processor 315 may recognize the input interface switching event when the hand gesture of the user points the external electronic device 320 for a specified time or based on a virtual click operation in the state in which the hand gesture of the user points the external electronic device 320. For example, the processor 315 may recognize the input interface switching event when the gaze of the user points the external electronic device 320 for a specified time.

According to an example embodiment, the processor 315 may select (or specify) the external electronic device 320 as an input device of the electronic device 310 based on at least the recognized input interface switching event. The processor 315 may receive a user input through the selected external electronic device 320, and receive a control signal corresponding to the received user input from the external electronic device 320. The processor 315 may perform an operation (or a task) (e.g., a screen control operation or a data processing operation) of the electronic device corresponding to the user input based on the control signal.

According to an example embodiment, the processor 315 may perform or control to perform at least some of the operations of the electronic device 310 in the augmented reality environment and/or the virtual reality environment using the external electronic device 320 based on a hardware component included in the external electronic device 320 or processing of the external electronic device 320.

According to an example embodiment, the external electronic device 320 may receive raw data from the user and provide the received raw data to the electronic device 310. The processor 315 may perform various processing operations using the received raw data. According to an embodiment, the processor 315 may receive the user input from the user using a sensor module 321 of the external electronic device 320, and receive an electrical signal corresponding to the received user input from the external electronic device 320. The processor 315 may perform an operation (or a task) corresponding to the user input based on the received electrical signal. For example, when the external electronic device 320 includes a touch pad (or a touch screen) and/or a physical button, the user may provide the user input such as scroll, click, and/or drag to the touch pad and/or the physical button of the external electronic device 320. The external electronic device 320 may provide an input signal corresponding to the user input to the electronic device 310. The processor 315 of the electronic device 310 may recognize that the user input is received through the external electronic device 320 based on the received input signal, and perform a corresponding operation. For example, the processor 315 may scroll, click, and/or drag a screen displayed on the display 311 based on the input signal.

According to an example embodiment, the processor 315 may perform some processing operations on the user input received in the external electronic device 320 using a processor 322 of the external electronic device 320. According to an example embodiment, the processor 315 may perform a first processing operation (e.g., a control operation for a user interface of the electronic device 310) through the processor 322 of the external electronic device 320 based on the user input received in the external electronic device 320, and perform a second processing operation (e.g., a relatively high-level data processing operation including rendering, encoding, decoding, and/or trans coding).

According to an example embodiment, when the external electronic device 320 is able to perform the relatively high-level data processing operation, the processor 315 may control the operation of the electronic device 310 through the external electronic device 320. For example, the external electronic device 320 may include a smart phone.

According to an example embodiment, the processor 315 may perform the operation of the electronic device 310 using an external server(s) (not shown) (e.g., a cloud server and a mobile edge computing (MEC)). According to an example embodiment, when the electronic device 310 supports a streaming service, a cloud service, and/or a wearable platform, the processor 315 may allow some of the operations of the electronic device 310 to be performed using the external server.

The processor 315 according to an example embodiment may perform some of the operations of the electronic device 310 using the external electronic device 320 in the above-described scheme based on the hardware component included in the connected external electronic device 320 or a processing method supported by the connected external electronic device 320.

Hereinafter, operations described as being performed by the electronic device 310 with reference to the drawings to be described below may be referred to as being performed by the processor 315. According to an example embodiment, the input signal input through the external electronic device 320 and the above-described screen control operation (the scroll, the click, and/or the drag) or the data processing operation (e.g., data input) of the electronic device 310 are only an example for convenience of description, and the disclosure is not limited thereto.

According to an example embodiment, the at least one processor 315 may recognize an input interface switching event of determining (or selecting) two or more external electronic devices among a plurality of external electronic devices displayed in the field of view of the user in the augmented reality environment as the input devices. For example, the processor 315 may recognize the input interface switching event based on coincidence of positions of the plurality of external electronic devices with the gaze direction of the user (and/or a position of the electronic device 310). According to an example embodiment, the processor 315 may further determine whether the gaze of the user stays on/proximate at least one of the plurality of external electronic devices for a set time or longer. For example, the processor 315 may recognize the input interface switching event based on the fact that the gaze of the user stays on the at least one of the plurality of external electronic devices for the set time or longer. According to an example embodiment, the processor 315 may allow a first external electronic device among the plurality of external electronic devices to receive an input signal for controlling at least some of operations of a second external electronic device based on the recognized input interface switching event. According to an example embodiment, in the augmented reality environment that the processor 315 creates and/or provides to the user, when the user provides a specified input to the first external electronic device, the second external electronic device may perform an operation corresponding to the specified input.

Referring to FIG. 3, the external electronic device 320 (e.g., the electronic device 102 or the electronic device 104 in FIG. 1) may include the sensor module 321, the processor 322, a communication circuit 323, and/or a feedback module 324 comprising circuitry. According to an example embodiment, the external electronic device 320 may include at least one of the smart phone, a smart watch, a smart ring, and/or a Bluetooth earphone. A plurality of such external devices 320 may be provided.

According to an example embodiment, the sensor module 321 may include a touch sensor and/or a 6-axis sensor (e.g., 6-axis acceleration/gyro sensor). For example, the sensor module 321 may sense a touch of the user using the touch sensor. For example, the sensor module 321 may sense an inclined angle and/or a moving speed of the external electronic device 320 using the 6-axis sensor.

According to an example embodiment, the processor 322 may receive at least a portion of the authority to control the electronic device 310 from the electronic device 310. For example, the processor 322 may receive the user input of scrolling, clicking, and/or dragging using the sensor module 321, and may transmit the received user input to the electronic device 310. For example, the processor 322 may provide an electrical and/or electronic signal corresponding to the received user input to the electronic device 310 through the communication circuit 323. For example, the processor 315 of the electronic device 310 may scroll, click, and/or drag the screen of the display 311 in response to the received electrical and/or electronic signal. For example, the processor 322 may receive data to be input to the electronic device 310 from the user, and may provide the received data to the electronic device 310 through the communication circuit 323. For example, the processor 315 of the electronic device 310 may output the received data to the display 311. For example, the processor 315 of the electronic device 310 may perform the various data processing operations using the received data. According to various embodiments, the processor 322 may receive the user input, and process at least a portion of data corresponding to the received user input to perform an operation (or a task) corresponding to the user input with respect to the electronic device 310.

According to an example embodiment, the communication circuit 323 may support the wireless communication scheme (e.g., the Bluetooth, the WiFi, and/or the 5G communication scheme). For example, the communication circuit 323 may transmit the electrical and/or electronic signal to the electronic device 310 such that the electronic device 310 performs the operation (or the task) (e.g., the screen control or the data processing) corresponding to the user input.

According to an example embodiment, the feedback module 324 may provide feedback to the user. For example, the feedback module 324 may include an acoustic module, a haptic module, and/or a light emitting module. According to an example embodiment, the feedback module 324 may provide the user with a mechanical and/or electrical stimulus informing that the electronic device 310 has performed the operation corresponding to the user input. For example, the processor 322 may provide the electrical and/or electronic signal for allowing the screen of the display 311 to be scrolled, clicked, and/or dragged to the electronic device 310. In this case, the feedback module 324 may generate sound, vibration, and/or light such that the user recognizes that the input for scrolling, clicking, and/or dragging the electronic device 310 has been input.

According to an example embodiment, the electronic device 310 may at least partially control the operation of the electronic device 310 using the external electronic device 320. According to an example embodiment, the electronic device 310 may recognize the gesture (e.g., the hand gesture and/or the gaze) of the user using the camera 312, and activate a first input mode of receiving the input for controlling the operation of the electronic device 310 based on at least the recognized gesture. According to an example embodiment, the electronic device 310 may activate a second input mode of receiving the input for controlling the operation of the electronic device 310 using the external electronic device 320 based on at least the input interface switching event. According to an example embodiment, the electronic device 310 may receive the input signal that may control the operation of the electronic device 310 using the external electronic device 320, so that fatigue of the user may be reduced, and the user may perform the input more intuitively.

According to an example embodiment, the electronic device 310 may receive an input signal that may control the operation of the second external electronic device using the first external electronic device. For example, the electronic device 310 may recognize the first external electronic device and the second external electronic device positioned in the field of view (FOV) of the user. According to an example embodiment, based on a time the gaze of the user stays and/or the gaze direction of the user, the electronic device 310 may receive the input signal that may control at least some of the operations of the second external electronic device from the first external electronic device. According to an example embodiment, the electronic device 310 may intuitively control the operation of the second external electronic device based on an interaction of the user, thereby providing the user with an improved user experience.

Figure 4:
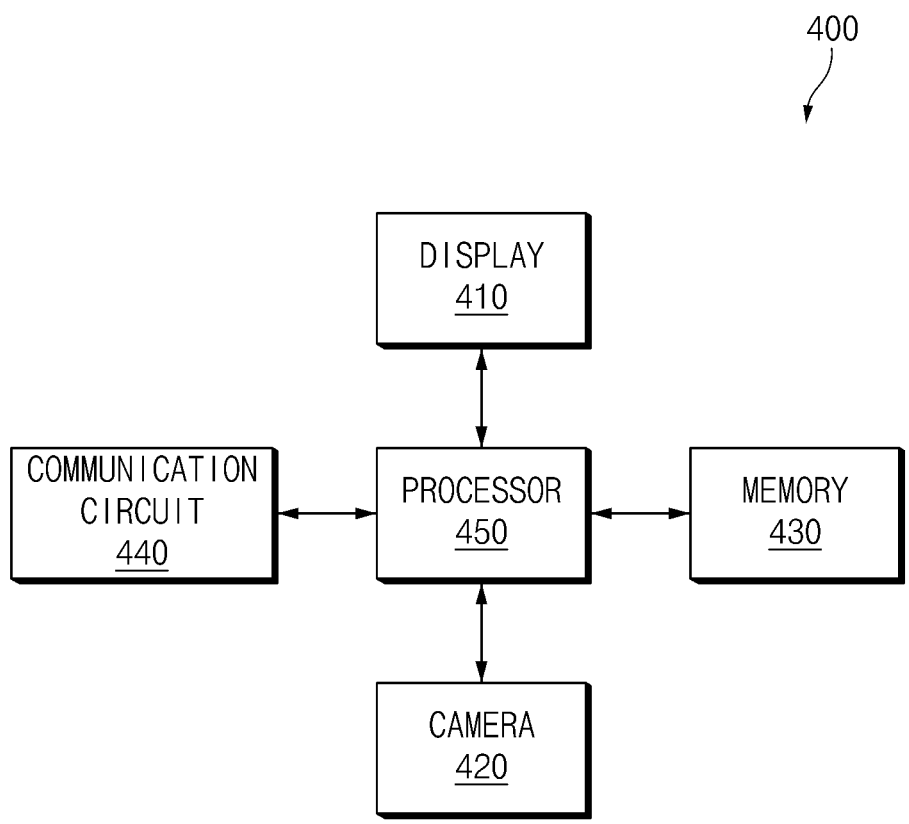
FIG. 4 is a block diagram of an electronic device, according to various example embodiments.

FIG. 4 is a block diagram of an electronic device, according to various example embodiments.

According to an embodiment, an electronic device 400 (e.g., the electronic device 101 in FIG. 1, the electronic device 201 in FIG. 2, and/or the electronic device 310 in FIG. 3) may include a display 410 (e.g., the display module 160 in FIG. 1, the display module 260 in FIG. 2, and/or the display 311 in FIG. 3), a camera 420 (e.g., the camera module 180 in FIG. 1, the camera module 280 in FIG. 2, and/or the camera 312 in FIG. 3), a memory 430 (e.g., the memory 130 in FIG. 1, the memory 230 in FIG. 2, and/or the memory 313 in FIG. 3), a communication circuit 440 (e.g., the communication module 190 in FIG. 1, the communication module 290 in FIG. 2, and/or the communication circuit 314 in FIG. 3), and/or a processor 450 comprising processing circuitry (e.g., the processor 120 in FIG. 1, the processor 220 in FIG. 2, and/or the processor 315 in FIG. 3). Because the components shown in FIG. 4 are the same as or substantially the same as the components of the electronic device 310 shown in FIG. 3, a redundant description will be omitted. Hereinafter, embodiments related to the case in which the electronic device 310 provides the augmented reality environment and/or the virtual reality environment will be described.

According to an example embodiment, the camera 420 may include a plurality of cameras. According to an example embodiment, a first camera among the plurality of cameras may recognize the hand gesture by tracking the movement of the user's hand. According to an example embodiment, a second camera among the plurality of cameras may recognize an external space corresponding to the gaze direction of the user or the direction the head of the user is facing. For example, the second camera may acquire the external image corresponding to the gaze direction of the user or the direction the head of the user is facing. According to an example embodiment, a third camera among the plurality of cameras may recognize the movement of the user's pupil. For example, the processor 450 may acquire information related to the time the gaze of the user stays on the object based on the movement of the user's pupil recognized by the third camera. As another example, the first camera or the second camera may perform substantially the same operation. As another example, one of the first camera and the second camera may be omitted.

According to an example embodiment, the processor 450 may activate the first input mode using the gesture of the user as input method of the electronic device 400 in the augmented reality environment. For example, the gesture of the user may include the hand gesture of the user and/or the gaze of the user. For example, the processor 450 may recognize the gesture of the user using the camera 420 in the augmented reality environment, and create and/or display a user interface (UI) representing the movement of the gesture of the user in the augmented reality environment. For example, the user interface may include an indication line extending from the tip of the finger of the user displayed on the display 410. In various embodiments, the user interface may include a ring cursor that indicates the position of the tip of the finger of the user displayed on the display 410. According to an example embodiment, the processor 450 may move the user interface based on the movement of the gesture of the user in the augmented reality environment.

According to an example embodiment, the processor 450 may recognize an input interface switching event of activating one of the second input mode and a third input mode. For example, the second input mode may correspond to a scheme of using the external electronic device (e.g., the electronic device 102, the electronic device 104 in FIG. 1 and/or the external electronic device 320 in FIG. 3) as input method of the electronic device 400. For example, the third input mode may correspond to a scheme using a mixture of the gesture of the user and the external electronic device as the input method of the electronic device 400. According to an example embodiment, the processor 450 may determine one of the second input mode and the third input mode based on the hardware component and/or the processing included in the external electronic device.

According to an example embodiment, in the augmented reality environment, the processor 450 may recognize an input interface switching event including a first hand gesture of the user of positioning the user interface at a position where the external electronic device is positioned and/or a second hand gesture of virtually clicking the external electronic device. According to an example embodiment, the processor 450 may activate the second input mode using the external electronic device as the input method of the electronic device 400 based on the recognized input interface switching event.

According to an example embodiment, the processor 450 may determine a profile of the external electronic device (and/or a hardware component of the external electronic device), and activate the second input mode based on the determined profile of the external electronic device. According to an example embodiment, when the external electronic device is the smartphone, the processor 450 may activate the second input mode of receiving an input signal for controlling the movement of the user interface through the smart phone. For example, the external electronic device may provide one of the vibration, the sound, and/or the light as the feedback to the user through the smart phone after transmitting the input signal for controlling an operation of the electronic device 400. In various embodiments, the processor 450 may control the external electronic device to process the user input received from the user, based on the hardware component of the external electronic device.

According to an example embodiment, the processor 450 may determine the profile of the external electronic device (and/or a hardware component of the external electronic device), and activate the third input mode based on the determined profile of the external electronic device. For example, when the external electronic device is the smart watch or the smart ring, the processor 450 may activate the third input mode of controlling the movement of the user interface by recognizing the hand gesture of the user while the external electronic device is being worn on the body part of the user, and providing one of the vibration, the sound, and/or the light as the feedback to the user through the smart watch or the smart ring. For example, when the external electronic device is the Bluetooth earphone, the processor 450 may activate the third input mode of recognizing the hand gesture of the user and receiving a signal for controlling the user interface, and providing the sound to the user as the feedback through the Bluetooth earphone. According to various embodiments, the processor 450 may control the operation of the electronic device 400 using the external server (not shown).

According to various embodiments, the processor 450 may recognize the first external electronic device and the second external electronic device positioned in the field of view of the user, and receive the input signal that may control the operation of the second external electronic device using the first external electronic device. For example, the processor 450 may recognize that the first external electronic device and the second external electronic device are positioned for a set time in a region corresponding to the gaze direction of the user (or the direction in which the head of the user is facing). For example, the processor 450 may recognize the gaze direction of the user to recognize that the electronic device 400, the first external electronic device, and the second external electronic device are positioned on a virtual straight line for the set time. According to an example embodiment, when the first external electronic device and the second external electronic device are positioned in the region corresponding to the gaze direction of the user for the set time, the processor 450 may receive at least a portion of the input signal for controlling the operation of the second external electronic device through the first external electronic device. For example, when the first external electronic device includes a display, the processor 450 may display a control UI for controlling the operation of the second external electronic device on the display of the first external electronic device. For example, when the user input is received through the control UI displayed on the display of the first external electronic device, the processor 450 may allow the second external electronic device to perform the operation (or the task) corresponding to the received user input. Hereinafter, operations as being performed by the electronic device 400 with reference to drawings to be described later may be referred to as being performed by the processor 450.

Figure 5:
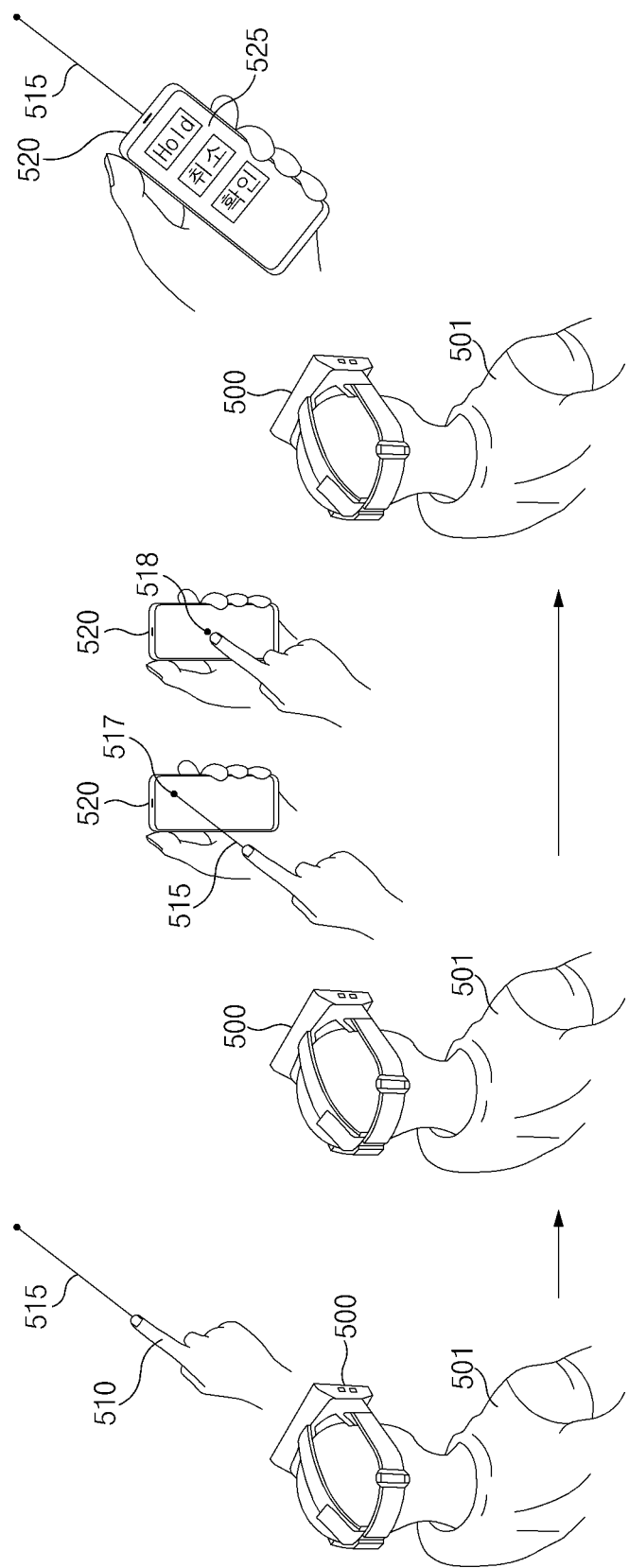
FIG. 5 is a view for illustrating an operation of an electronic device according to various example embodiments.

FIG. 5 is a view for illustrating an operation of an electronic device according to various example embodiments.

Referring to FIG. 5, a user 501 may wear an electronic device 500 (e.g., the electronic device 101 in FIG. 1, the electronic device 201 in FIG. 2, the electronic device 310 in FIG. 3, and/or the electronic device 400 in FIG. 4) on a head thereof. Hereinafter, embodiments related to a case in which the electronic device 500 provides the augmented reality environment and/or the virtual reality environment will be described.

According to an example embodiment, in the state of being worn on the head of the user 501, the electronic device 500 may recognize hand gesture 510 of the user 501 using a camera (e.g., the camera module 180 in FIG. 1, the camera module 280 in FIG. 2, the camera 312 in FIG. 3, and/or the camera 420 in FIG. 4). According to an example embodiment, the electronic device 500 may activate the first input mode using the recognized hand gesture 510 as the input.

According to an example embodiment, the electronic device 500 may create a user interface 515 in the augmented reality environment and/or the virtual reality environment such that the user 501 may visually recognize a movement of the recognized hand gesture 510 of the user 501. For example, the user interface 515 may include an indication line extending from a tip of a finger of the user 501 and/or a circle indicating an end of the indication line. According to an example embodiment, the electronic device 500 may move the user interface 515 based on a movement of the hand gesture 510 of the user 501.

Referring to FIG. 5, the electronic device 500 may recognize an input interface switching event. For example, the electronic device 500 may recognize a first hand gesture 517 of the user 501 positioning the user interface 515 at a point at which an external electronic device 520 (e.g., the electronic device 102, the electronic device 104 in FIG. 1 and/or the external electronic device 320 in FIG. 3) is displayed in the augmented reality environment and/or the virtual reality environment. As another example, the electronic device 500 may recognize a second hand gesture 518 of the user 501 of virtually touching the external electronic device 520 displayed in the augmented reality environment and/or the virtual reality environment using the user interface 515. According to an example embodiment, the electronic device 500 may specify (or select) the external electronic device 520 and use the external electronic device 520 as the input method based on the recognition of the input interface switching event including the first hand gesture 517 and/or the second hand gesture 518. According to an example embodiment, the electronic device 500 may activate the second input mode using the external electronic device 520 as the input method of the electronic device 500 based on at least the recognition of the input interface switching event.

Referring to FIG. 5, the electronic device 500 according to an embodiment may control the user interface 515 such that the user interface 515 moves in response to a movement of the external electronic device 520. For example, in the second input mode, the electronic device 500 may perform various operations of the electronic device 500 based on the user interface 515 moving along the external electronic device 520. According to an example embodiment, a display 525 of the external electronic device 520 may display a screen for controlling the electronic device 500. For example, the screen may include at least one object. For example, when a user input is received through the display 525 (or a touch screen) included in the external electronic device 520, the electronic device 500 may perform the operation (and/or the task) corresponding to the received user input in the augmented reality environment and/or the virtual reality environment. For example, a user input corresponding to clicking on the screen displayed on the display of the electronic device 500 may be received on the display 525 of the external electronic device 520. The electronic device 500 may control the screen displayed on the display of the electronic device 500 in the augmented reality environment and/or the virtual reality environment based on the user input received through the external electronic device 520. According to an example embodiment, the external electronic device 520 may further include the feedback module that provides the feedback to the user 501. For example, the electronic device 500 may provide the feedback including at least one of the vibration, the sound, and/or the light to the user 501 using the external electronic device 520 based on the performance of the operation (e.g., the click) corresponding to the user input through the external electronic device 520. As an example, because the user 501 has to raise the hand thereof such that the hand of the user 501 is included in the field of view (FOV) for the hand gesture to be recognized by the camera, body fatigue of the user 501 may increase. According to an example embodiment, the user 501 of the electronic device 500 is able to control the operation of the electronic device 500 using the external electronic device 520, so that the body fatigue may be reduced.

Figure 6:
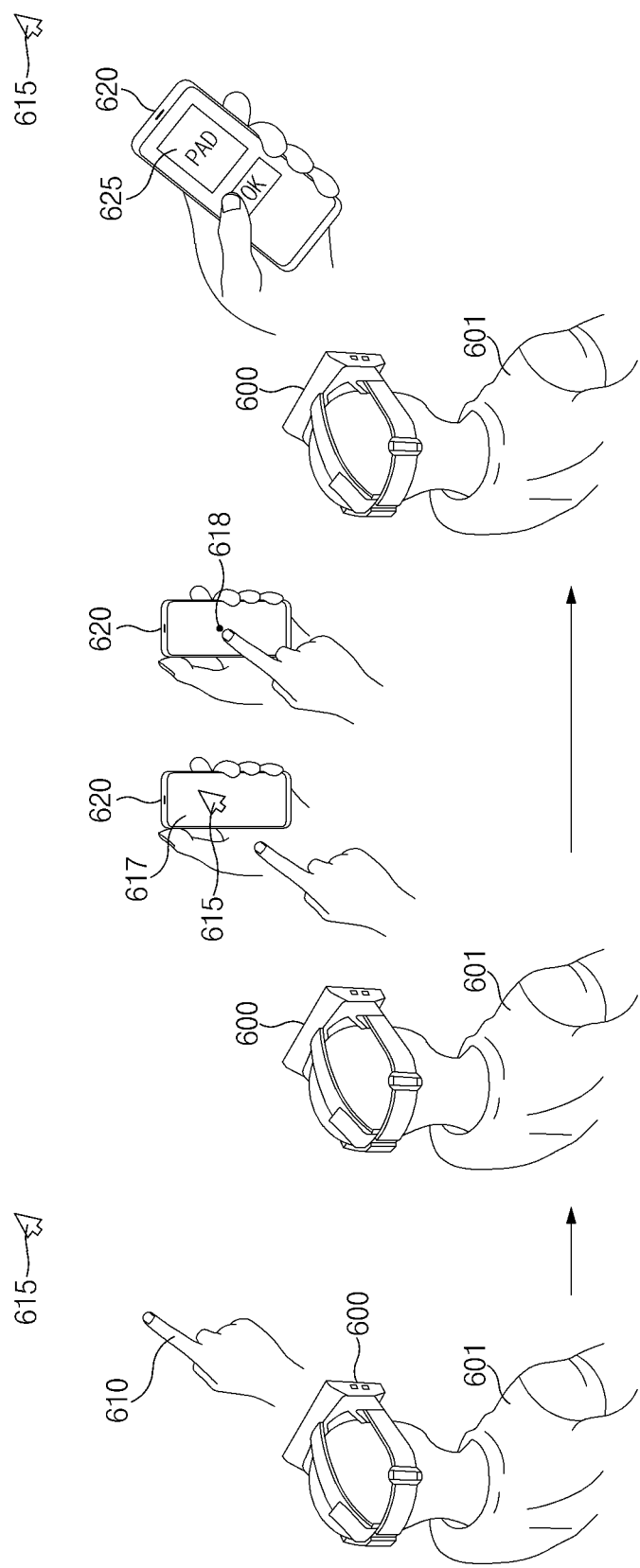
FIG. 6 is a view for illustrating an operation of an electronic device according to various example embodiments.

FIG. 6 is a view for illustrating an operation of an electronic device according to various example embodiments.

Referring to FIG. 6, a user 601 may wear an electronic device 600 (e.g., the electronic device 101 in FIG. 1, the electronic device 201 in FIG. 2, the electronic device 310 in FIG. 3, the electronic device 400 in FIG. 4, and/or the electronic device 500 in FIG. 5) on a head thereof. Hereinafter, embodiments related to a case in which the electronic device 600 provides the augmented reality environment and/or the virtual reality environment will be described.

According to an example embodiment, in the state of being worn on the head of the user 601, the electronic device 600 may recognize a hand gesture 610 of the user 601 using a camera (e.g., the camera module 180 in FIG. 1, the camera module 280 in FIG. 2, the camera 312 in FIG. 3, and/or the camera 420 in FIG. 4). According to an example embodiment, the electronic device 600 may activate the first input mode using the hand gesture 610 as input method of the electronic device 600.

According to an example embodiment, the electronic device 600 may create a user interface 615 moving along with the hand gesture 610 in the augmented reality environment and/or the virtual reality environment such that the user 601 may visually recognize a movement of the hand gesture 610. For example, the user interface 615 may have a form of a cursor. According to an example embodiment, the electronic device 600 may move the user interface 615 based on the movement of the hand gesture 610 of the user 601.

Referring to FIG. 6, the electronic device 600 may recognize an input interface switching event. For example, the electronic device 600 may recognize a first hand gesture 617 of positioning the user interface 615 at a point at which an external electronic device 620 (e.g., the electronic device 102 or the electronic device 104 in FIG. 1 and/or the external electronic device 320 in FIG. 3) is displayed in the augmented reality environment and/or the virtual reality environment. As another example, the electronic device 600 may recognize a second hand gesture 618 of virtually touching the external electronic device 620 using the user interface 615. According to an example embodiment, the electronic device 600 may specify the external electronic device 620 based on the input interface switching event including the first hand gesture 617 and/or the second hand gesture 618. According to an example embodiment, the electronic device 600 may activate the second input mode using the specified external electronic device 620 as an input method of the electronic device 600.

Referring to FIG. 6, the electronic device 600 may control the user interface 615 to move in response to a movement of the external electronic device 620. For example, in the second input mode, the electronic device 600 may perform an operation of the electronic device 600 based on an operation of the external electronic device 620. According to an example embodiment, a display 625 of the external electronic device 620 may display a screen for controlling the electronic device 600. For example, the screen may include at least one object. For example, the user 601 may provide the user input to a touch screen 625 (or a touch pad) included in the external electronic device 620. The electronic device 600 may receive the user input from the external electronic device 620, and may perform the operation (or the task) corresponding to the received user input. For example, the user 601 may input a user input (e.g., a scroll input) of scrolling the touch screen 625 of the external electronic device 620 to the external electronic device 620. The electronic device 600 may scroll the display screen displayed on the display of the electronic device 600 in the augmented reality environment and/or the virtual reality environment based on the scroll input of the user 601 received by the touch screen 625 of the external electronic device 620. In various embodiments, when the external electronic device 620 receives data input through the touch screen 625, the electronic device 600 may perform the data input operation in the augmented reality environment and/or the virtual reality environment using the data input through the touch screen 625. According to an example embodiment, the external electronic device 620 may further include a feedback module that provides the feedback to the user 601. For example, when the operation (e.g., the scroll) corresponding to the user input is performed through the external electronic device 620, the electronic device 600 may provide the feedback including at least one of the vibration, the sound, and/or the light to the user 601 using the external electronic device 620.

Figure 7:
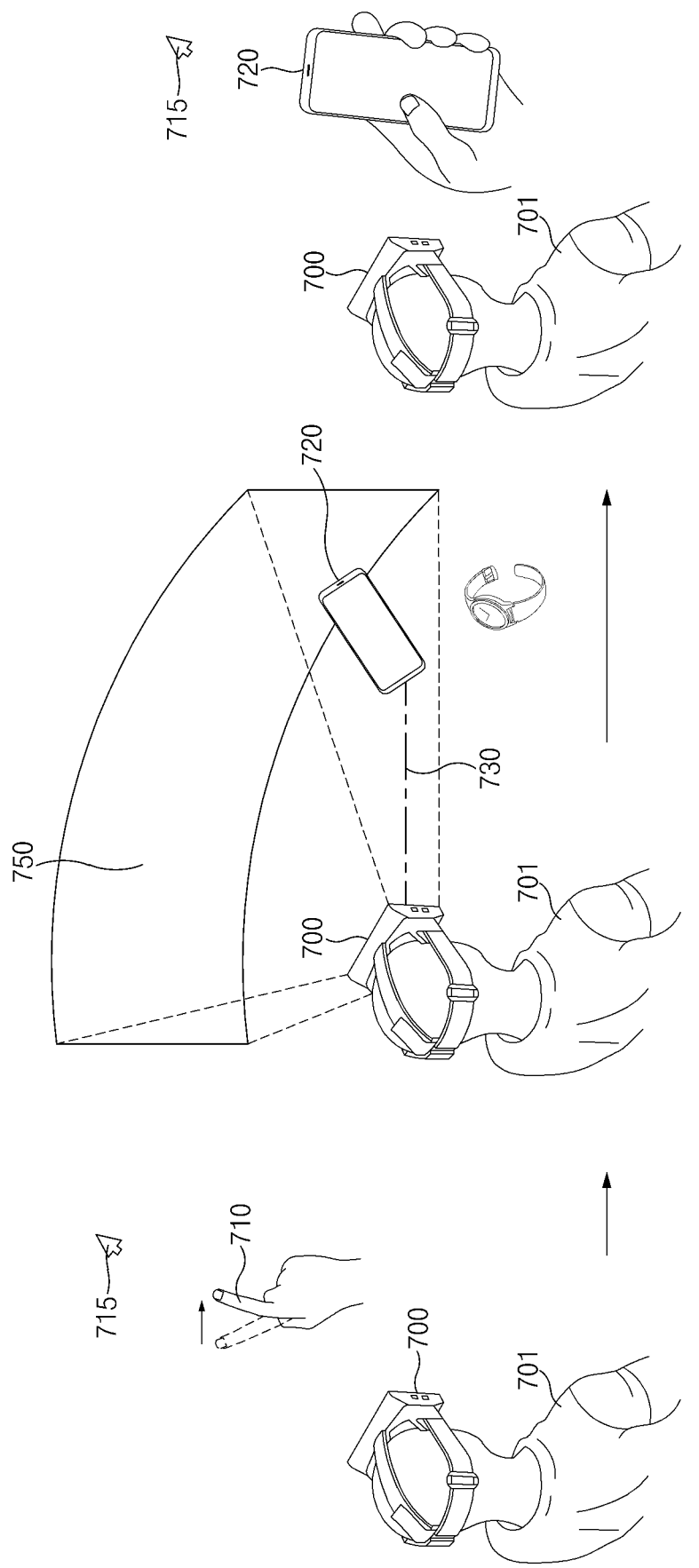
FIG. 7 is a view for illustrating an operation of an electronic device according to various example embodiments.

FIG. 7 is a view for illustrating an operation of an electronic device according to various example embodiments.

Referring to FIG. 7, a user 701 may wear an electronic device 700 (e.g., the electronic device 101 in FIG. 1, the electronic device 201 in FIG. 2, the electronic device 310 in FIG. 3, the electronic device 400 in FIG. 4, the electronic device 500 in FIG. 5, and/or the electronic device 600 in FIG. 6) on a head thereof. Hereinafter, embodiments related to a case in which the electronic device 700 provides the augmented reality environment and/or the virtual reality environment will be described.

According to an example embodiment, the electronic device 700 may recognize a hand gesture 710 of the user 701 using a camera (e.g., the camera module 180 in FIG. 1, the camera module 280 in FIG. 2, the camera 312 in FIG. 3, and/or the camera 420 in FIG. 4). According to an example embodiment, the electronic device 700 may activate the first input mode using the hand gesture 710 of the user 701 as input method of the electronic device 700. The electronic device 700 may create a user interface 715 in the augmented reality environment and/or the virtual reality environment such that the user 701 may visually recognize a movement of the hand gesture 710 of the user 701. According to an example embodiment, the electronic device 700 may control the user interface 715 to move based on the movement of the hand gesture 710 of the user 701.

Referring to FIG. 7, the electronic device 700 may identify a region (or a space) 750 corresponding to a field of view (FOV) of the user 701 in the state of being worn on the head of the user 701. According to an example embodiment, the electronic device 700 may acquire an image corresponding to a gaze direction of the user 701 and/or a direction in which the head of the user 701 is facing through the camera to recognize an external electronic device 720 included in the region 750 corresponding to the field of view (FOV). According to an example embodiment, the electronic device 700 may recognize a movement of a pupil of the user 701 using the camera. According to an example embodiment, the electronic device 700 may use the camera to acquire information on a time a gaze 730 of the user 701 corresponding to a direction in which the pupil of the user 701 is facing stays (or remains) on the external electronic device 720. According to an example embodiment, the electronic device 700 may determine whether the time the gaze 730 of the user 701 stays on the external electronic device 720 is equal to or greater than the set time. For example, when the time the gaze 730 of the user 701 stays on the external electronic device 720 is equal to or greater than the set time, the electronic device 700 may recognize that the input interface switching event has occurred.

According to an example embodiment, the electronic device 700 may determine a profile of the external electronic device 720 on which the gaze 730 of the user 701 has stayed for the set time or longer and/or a hardware component included in the external electronic device 720 based on the input interface switching event, and determine an input scheme of the electronic device 700 based on the determined profile and/or hardware component. For example, when recognizing that the external electronic device 720 is a device capable of receiving the user input from the user 701 as a result of the determination of the profile of the external electronic device 720 and/or the hardware component of the external electronic device 720, the electronic device 700 may determine the second input mode as the input scheme of the electronic device 700. According to an example embodiment, when the external electronic device 720 corresponds to a smartphone, the electronic device 700 may activate the second input mode using the external electronic device 720 as an input method of the electronic device 700. For example, the second input mode may correspond to an input scheme that does not necessarily use the hand gesture 710 of the user 701 as an input method of the electronic device 700, but uses the external electronic device 720 as an input method of the electronic device 700.

Referring to FIG. 7, the electronic device 700 may control the user interface 715 to move in response to a movement of the external electronic device 720. For example, when the external electronic device 720 includes the smart phone, the electronic device 700 may perform an operation (e.g., the scroll, the click, and/or the drag) of the electronic device 700 based on the user input received through the external electronic device 720. According to an example embodiment, when the external electronic device 720 includes a feedback module (e.g., the feedback module 324 in FIG. 3), the electronic device 700 may provide the feedback (e.g., the sound, the vibration, and/or the light) for the operation of the electronic device 700 to the user 701 through the external electronic device 720.

Figure 8:
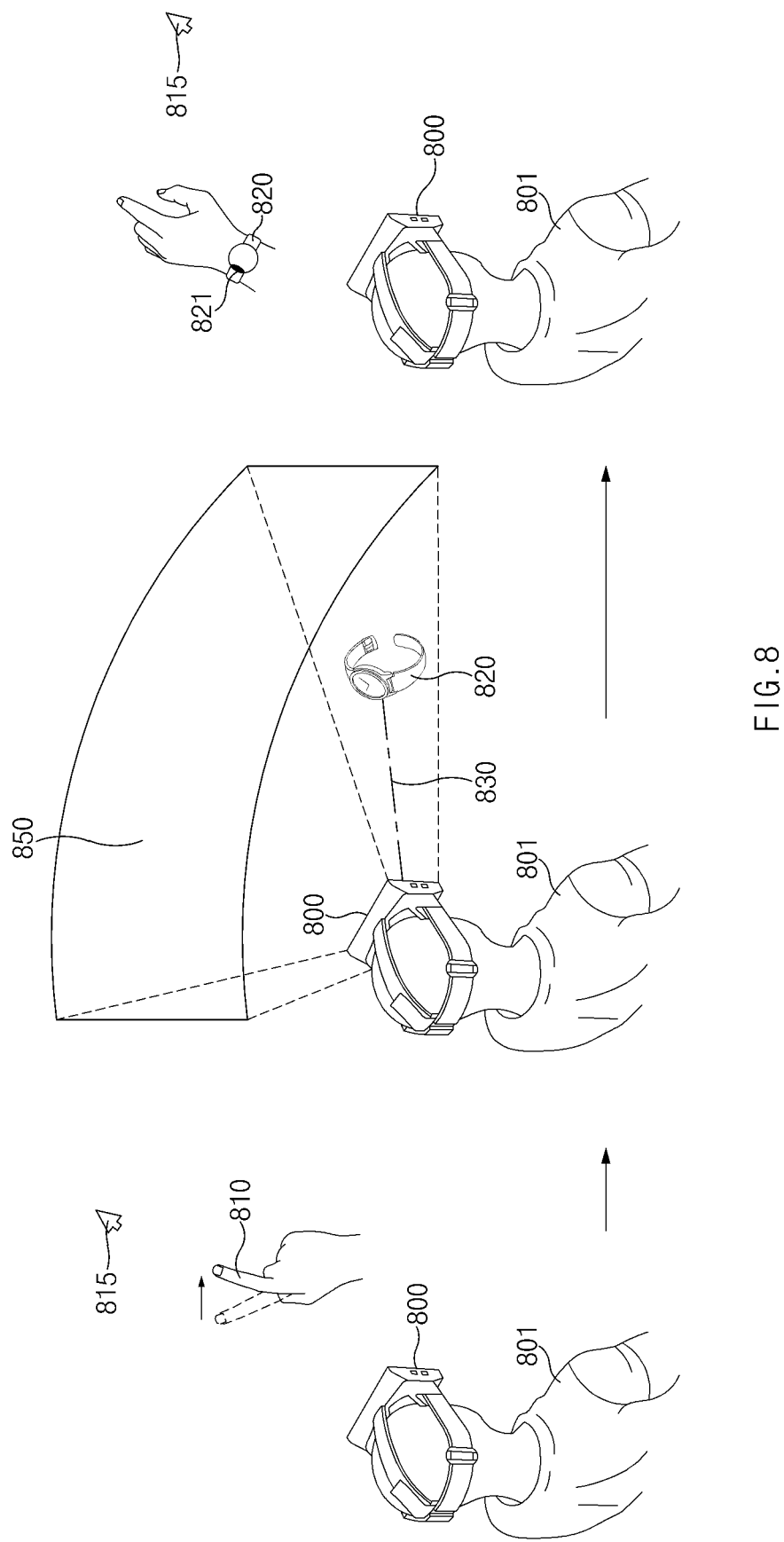
FIG. 8 is a view for illustrating an operation of an electronic device according to various example embodiments.

FIG. 8 is a view for illustrating an operation of an electronic device according to various example embodiments.

Referring to FIG. 8, a user 801 may wear an electronic device 800 (e.g., the electronic device 101 in FIG. 1, the electronic device 201 in FIG. 2, the electronic device 310 in FIG. 3, the electronic device 400 in FIG. 4, the electronic device 500 in FIG. 5, the electronic device 600 in FIG. 6, and/or the electronic device 700 in FIG. 7) on a head thereof. Hereinafter, embodiments related to a case in which the electronic device 800 provides the augmented reality environment and/or the virtual reality environment will be described.

According to an example embodiment, the electronic device 800 may recognize a hand gesture 810 of the user 801 using a camera (e.g., the camera module 180 in FIG. 1, the camera module 280 in FIG. 2, the camera 312 in FIG. 3, and/or the camera 420 in FIG. 4). According to an example embodiment, the electronic device 800 may activate the first input mode using the hand gesture 810 of the user 801 as input method of the electronic device 800. The electronic device 800 may create a user interface 815 in the augmented reality environment and/or the virtual reality environment such that the user 801 may visually recognize a movement of the hand gesture 810 of the user 801. According to an example embodiment, the electronic device 800 may control the user interface 815 to move based on the movement of the hand gesture 810 of the user 801.

Referring to FIG. 8, the electronic device 800 may identify a region (or a space) 850 corresponding to a field of view (FOV) of the user 801. According to an example embodiment, the electronic device 800 may acquire an image corresponding to a gaze direction of the user 801 or a direction in which the head of the user 801 is facing through the camera to recognize an external electronic device 820 included in the region 850 corresponding to the field of view (FOV). According to an example embodiment, the electronic device 800 may recognize a movement of a pupil of the user 801 using the camera. For example, the electronic device 800 may use the camera to acquire information on a time a gaze 830 of the user 801 stays (or remains) on the external electronic device 820. For example, when the time the gaze 830 of the user 801 stays on the external electronic device 820 is equal to or greater than the set time, the electronic device 800 may recognize that the input interface switching event has occurred.

According to an example embodiment, the electronic device 800 may determine a profile of the external electronic device 820 on which the gaze 830 of the user 801 has stayed for the set time or longer and/or a hardware component included in the external electronic device 820 based on the input interface switching event, and determine an input scheme of the electronic device 800 based on the determined profile and/or hardware component. For example, when recognizing that the external electronic device 820 is a device with a limitation in receiving the user input from the user 801 as a result of the determination of the profile of the external electronic device 820 and/or the hardware component of the external electronic device 820, the electronic device 800 may determine the third input mode as the input scheme of the electronic device 800. The limitation may include, for example, presence or absence of a display, a size of the display, presence or absence of a button, or a wearing part. For example, when the external electronic device 820 corresponds to one of the smart watch, the smart ring, and the Bluetooth earphone, the electronic device 800 may activate the third input mode using the hand gesture 810 of the user 801 and the external electronic device 820 together as an input method of the electronic device 800. For example, the third input mode may correspond to an input scheme using a mixture of the hand gesture 810 of the user 801 and the external electronic device 820 as an input method of the electronic device 800.

Referring to FIG. 8, the electronic device 800 may recognize the hand gesture 810 of the user 801 in a state in which the external electronic device 820 is being worn on a body part of the user 801. The electronic device 800 may control the user interface 815 to move based on the recognized hand gesture 810, and may control feedback (e.g., the sound, the vibration, and/or the light) for an operation (e.g., the scroll, the click, and/or the drag) of the electronic device 800 to be provided to the user 801 through a feedback module 821 included in the external electronic device 820. For example, when the external electronic device 820 is a smart watch including a haptic module, the electronic device 800 may receive various inputs based on the hand gesture 810 of the user 801, performs an operation corresponding to the input, and provide feedback (e.g., the vibration) corresponding to the input or the operation to the user 801.

Figure 9:
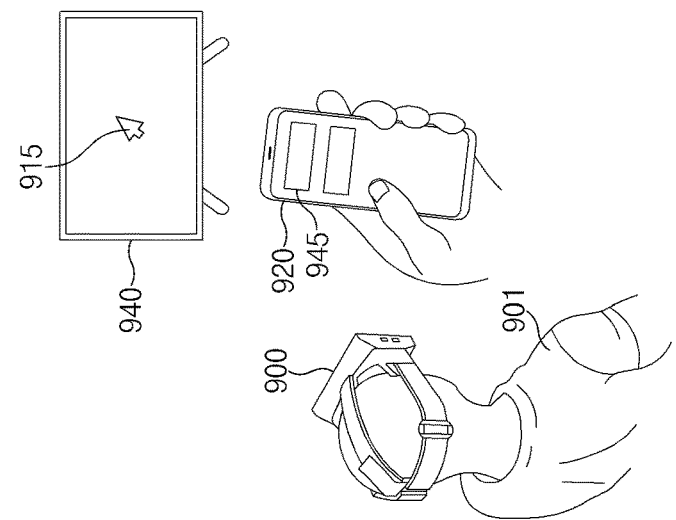
FIG. 9 is a view for illustrating an operation of an electronic device according to various example embodiments.

FIG. 9 is a view for illustrating an operation of an electronic device according to various example embodiments.

Referring to FIG. 9, a user 901 may wear an electronic device 900 (e.g., the electronic device 101 in FIG. 1, the electronic device 201 in FIG. 2, the electronic device 310 in FIG. 3, the electronic device 400 in FIG. 4, the electronic device 500 in FIG. 5, the electronic device 600 in FIG. 6, the electronic device 700 in FIG. 7, and/or the electronic device 800 in FIG. 8) on a head thereof. Hereinafter, embodiments related to a case in which the electronic device 900 provides the augmented reality environment and/or the virtual reality environment will be described.

According to an example embodiment, the electronic device 900 may be connected to a plurality of external electronic devices 920 and 940 through at least one communication circuit. According to an example embodiment, the electronic device 900 may determine a relative position or alignment state with the plurality of external electronic devices 920 and 940. The electronic device 900 may control at least some of operations of the second external electronic device 940 using the first external electronic device 920 based on the determined relative position or alignment state.

According to an example embodiment, the electronic device 900 may recognize a hand gesture 910 of the user 901 using a camera (e.g., the camera module 180 in FIG. 1, the camera module 280 in FIG. 2, the camera 312 in FIG. 3, and/or the camera 420 in FIG. 4). According to an example embodiment, the electronic device 900 may display a user interface 915 in the augmented reality environment and/or the virtual reality environment such that the user 901 may visually recognize a movement of the hand gesture 910 of the user 901.

Referring to FIG. 9, the electronic device 900 may identify a region (or a space) 950 corresponding to a field of view (FOV) of the user 901. According to an example embodiment, the electronic device 900 may acquire an image corresponding to a gaze direction of the user 901 or a direction in which the head of the user 901 is facing through the camera to recognize a plurality of external electronic devices 920, 940, and 960 included in the region 950 corresponding to the field of view (FOV).

According to an example embodiment, the electronic device 900 may recognize a movement of a pupil of the user 901 using the camera. For example, the electronic device 900 may use the camera to recognize the first external electronic device 920 and the second external electronic device 940 positioned (or aligned) in the region corresponding to a gaze 930 of the user 901. In various embodiments, the electronic device 900 may identify an angle of the gaze 930 of the user 901 and/or a position of the first external electronic device 920 and a position of the second external electronic device 940 to recognize whether the first external electronic device 920 and the second external electronic device 940 are positioned (or aligned) in the region corresponding to the gaze 930 of the user 901.

According to an example embodiment, when the first external electronic device 920 and the second external electronic device 940 are positioned (or aligned) in the region corresponding to the gaze 930 of the user 901, and the gaze 930 of the user 901 is stopped for the set time on the first external electronic device 920, the electronic device 900 may recognize that the input interface switching event has occurred. In various embodiments, when the first external electronic device 920 and the second external electronic device 940 are positioned (or aligned) in the region corresponding to the gaze 930 of the user 901, and the user interface 915 stays on the first external electronic device 920 for the set time, the electronic device 900 may recognize that the input interface switching event has occurred.

For example, when the gaze 930 of the user 901 is stopped on the first external electronic device 920 for the set time, the electronic device 900 may select the first external electronic device 920 as input method of controlling the second external electronic device 940 positioned in the region corresponding to the gaze 930 of the user 901.

Referring to FIG. 9, the electronic device 900 may use (or select) the first external electronic device 920 as an input method of the second external electronic device 940. For example, the first external electronic device 920 may include the smartphone, and the second external electronic device 940 may include an Internet of Things (IoT) and an electronic device (e.g., a smart TV). According to an example embodiment, the electronic device 900 may display a control interface 945 for controlling an operation of the second external electronic device 940 on the first external electronic device 920 based on selection of the first external electronic device 920. For example, the control interface 945 may include at least one object related to the operation of the second external electronic device 940. For example, the electronic device 900 may display the control interface 945 for changing a channel or a volume of the external electronic device 940 including the smart TV on the first external electronic device 920. The user 901 of the electronic device 900 may provide the user input to the first external electronic device 920 through the control interface 945. The electronic device 900 may control the second external electronic device 940 to operate based on the user input received by the first external electronic device 920.

In various embodiments, the second external electronic device 940 may be the virtual object displayed in the augmented reality environment and/or the virtual reality environment rather than the real object. Even when the second external electronic device 940 is the virtual object, the first external electronic device 920 may be selected as the input method for controlling the second external electronic device 940 in a scheme the same as or similar to that in the above-described embodiment.

An electronic device (e.g., the electronic device 101 in FIG. 1, the electronic device 201 in FIG. 2, the electronic device 310 in FIG. 3, the electronic device 400 in FIG. 4, the electronic device 500 in FIG. 5, the electronic device 600 in FIG. 6, the electronic device 700 in FIG. 7, the electronic device 800 in FIG. 8, and/or the electronic device 900 in FIG. 9) according to an example embodiment of the disclosure may include a display (e.g., the display module 160 in FIG. 1, the display module 260 in FIG. 2, the display 311 in FIG. 3, and/or the display 410 in FIG. 4), a communication circuit (e.g., the communication module 190 in FIG. 1, the communication module 290 in FIG. 2, the communication circuit 314 in FIG. 3, and/or the communication circuit 440 in FIG. 4), at least one camera (e.g., the camera module 180 in FIG. 1, the camera module 280 in FIG. 2, the camera 312 in FIG. 3, and/or the camera 420 in FIG. 4), a memory (e.g., the memory 130 in FIG. 1, the memory 230 in FIG. 2, the memory 313 in FIG. 3, and/or the memory 430 in FIG. 4), and at least one processor (e.g., the processor 120 in FIG. 1, the processor 220 in FIG. 2, the processor 315 in FIG. 3, and/or the processor 450 in FIG. 4) operatively connected to the display, the communication circuit, the at least one camera, and the memory. According to an example embodiment, the memory may store instructions that, when executed, are configured to cause the at least one processor to provide an augmented reality (AR) environment or a virtual reality (VR) environment through the display, connect the electronic device and at least one external electronic device through the communication circuit, display the at least one external electronic device through the display, specify a first external electronic device among the displayed at least one external electronic device based on an input interface switching event, and control an operation of the electronic device in the augmented reality environment or the virtual reality environment using the specified first external electronic device.

According to an example embodiment, the at least one camera may include a first camera for recognizing a hand gesture of a user, and the instructions may cause the processor to create a user interface moving based on a movement of the hand gesture in the augmented reality environment or the virtual reality environment.

According to an example embodiment, the instructions may cause the processor to specify the first external electronic device based on the input interface switching event including a first hand gesture of positioning the created user interface at a point where the first external electronic device is displayed, and a second hand gesture of virtually touching the first external electronic device using the user interface.

According to an example embodiment, the instructions may cause the processor to move the user interface based on a movement of the first external electronic device in the augmented reality environment or the virtual reality environment.

According to an example embodiment, the instructions may cause the processor to perform a scroll operation or a data input operation in the augmented reality environment or the virtual reality environment based on an input provided by a user through a touch screen when the first external electronic device includes the touch screen.

According to an example embodiment, the instructions may cause the processor to provide feedback related to the operation of the electronic device including at least one of vibration, sound, and light using at least one of a haptic module, an acoustic module, and a light emitting module when the first external electronic device includes at least one of the haptic module, the acoustic module, and the light emitting module.

According to an example embodiment, the at least one camera may include a second camera for recognizing a gaze direction of a user, and the instructions may cause the processor to specify the first external electronic device based on the input interface switching event where the first external electronic device is positioned for a set time in a region corresponding to the gaze direction of the user recognized by the second camera.

According to an example embodiment, the instructions may cause the processor to create a user interface moving based on a movement of the first external electronic device in the augmented reality environment or the virtual reality environment.

According to an example embodiment, the at least one camera may include a second camera for recognizing a facing direction of a head of a user, and the instructions may cause the processor to assign an authority to control an operation of a second external electronic device to the first external electronic device when the first external electronic device and the second external electronic device included in the at least one external electronic device are positioned for a set time in a region corresponding to a gaze direction of the user or the facing direction of the head of the user recognized by the second camera.

According to an example embodiment, the instructions may cause the processor to allow the first external electronic device to display a control interface for controlling the operation of the second external electronic device, and provide feedback related to the operation of the second external electronic device including at least one of vibration, sound, and light using at least one of a haptic module, an acoustic module, and a light emitting module when the first external electronic device includes at least one of the haptic module, the acoustic module, and the light emitting module.

An electronic device (e.g., the electronic device 101 in FIG. 1, the electronic device 201 in FIG. 2, the electronic device 310 in FIG. 3, the electronic device 400 in FIG. 4, the electronic device 500 in FIG. 5, the electronic device 600 in FIG. 6, the electronic device 700 in FIG. 7, the electronic device 800 in FIG. 8, or the electronic device 900 in FIG. 9) according to an embodiment of the disclosure includes a display (e.g., the display module 160 in FIG. 1, the display module 260 in FIG. 2, the display 311 in FIG. 3, or the display 410 in FIG. 4), a communication circuit (e.g., the communication module 190 in FIG. 1, the communication module 290 in FIG. 2, the communication circuit 314 in FIG. 3, or the communication circuit 440 in FIG. 4), at least one camera (e.g., the camera module 180 in FIG. 1, the camera module 280 in FIG. 2, the camera 312 in FIG. 3, or the camera 420 in FIG. 4), a memory (e.g., the memory 130 in FIG. 1, the memory 230 in FIG. 2, the memory 313 in FIG. 3, or the memory 430 in FIG. 4), and a processor (e.g., the processor 120 in FIG. 1, the processor 220 in FIG. 2, the processor 315 in FIG. 3, or the processor 450 in FIG. 4) operatively connected to the display, the communication circuit, the at least one camera, and the memory. According to an example embodiment, the memory stores instructions that, when executed, cause the processor to provide an augmented reality (AR) environment or a virtual reality (VR) environment through the display, be connected to an external electronic device through the communication circuit, display the external electronic device through the display, activate a first input mode for controlling the electronic device using a hand gesture of a user while the augmented reality environment or the virtual reality environment is provided, and activate a second input mode for controlling the electronic device using the hand gesture and the external electronic device based on reception of an input interface switching request provided by the user while the first input mode is activated.

According to an example embodiment, the instructions may cause the processor to display a user interface indicating whether the first input mode is activated in the augmented reality environment or the virtual reality environment, and activate the second input mode based on a hand gesture of the user of positioning the user interface on the external electronic device.

According to an example embodiment, the instructions may cause the processor to recognize a gaze direction of the user or a facing direction of a head of the user using the at least one camera, and activate the second input mode by recognizing that the external electronic device is positioned for a set time in a region corresponding to the gaze direction or the facing direction of the head.

According to an example embodiment, the instructions may cause the processor to display a control interface supporting the second input mode on a display included in the external electronic device in response to the activation of the second input mode, and perform a task corresponding to a user input based on the user input received through the control interface.

According to an example embodiment, the task may include at least one of an operation of scrolling a screen displayed on the display and an operation of inputting data corresponding to the user input in the augmented reality environment or the virtual reality environment.

Figure 10:
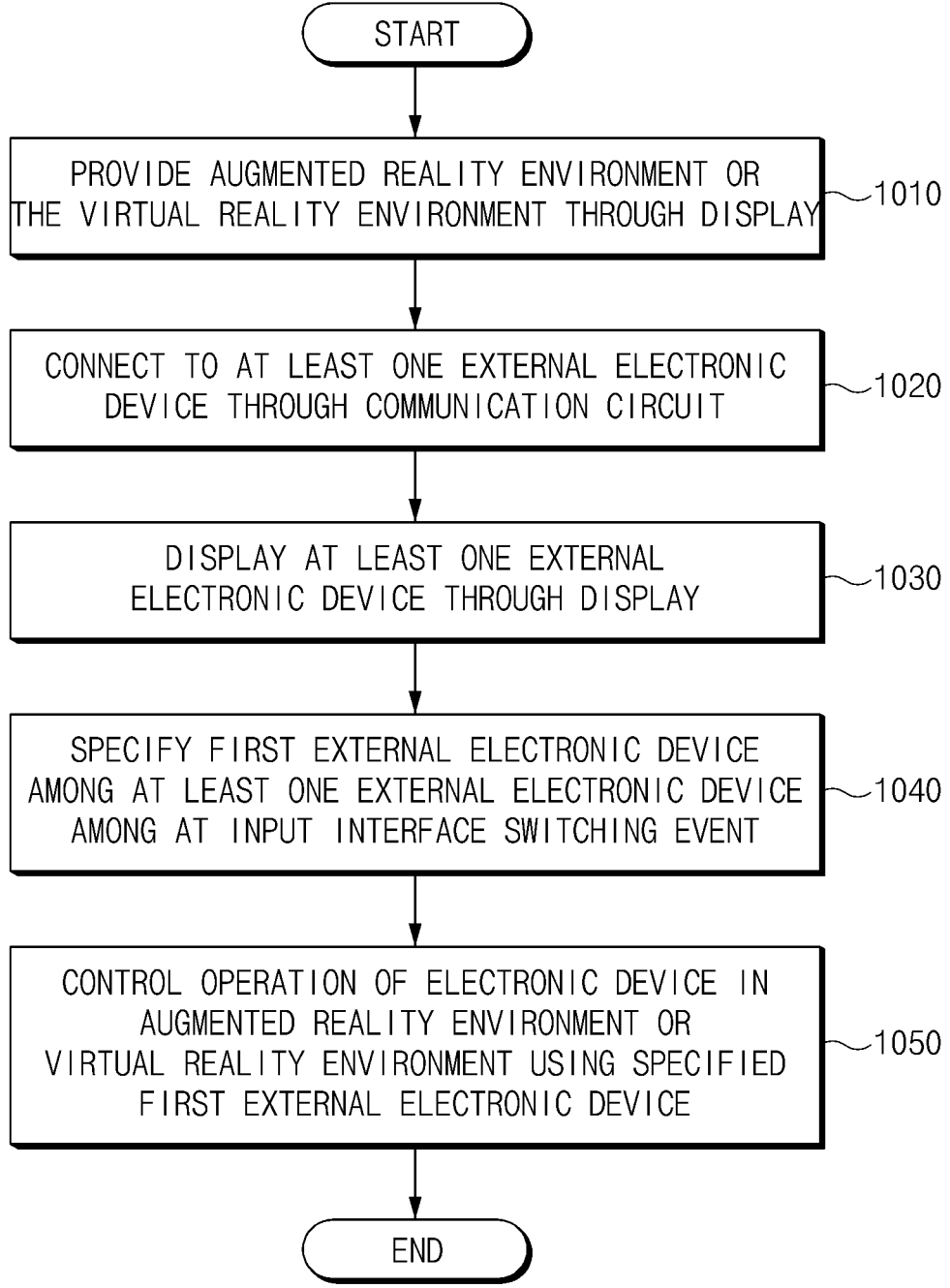
FIG. 10 is a flowchart of an operation method of an electronic device, according to various example embodiments.

FIG. 10 is a flowchart of an operation method of an electronic device, according to various embodiments.

According to an example embodiment, in operation 1010, an electronic device (e.g., the electronic device 101 in FIG. 1, the electronic device 201 in FIG. 2, the electronic device 310 in FIG. 3, the electronic device 400 in FIG. 4, the electronic device 500 in FIG. 5, the electronic device 600 in FIG. 6, the electronic device 700 in FIG. 7, the electronic device 800 in FIG. 8, or the electronic device 900 in FIG. 9) may provide the augmented reality (AR) environment or the virtual reality (VR) environment through a display (e.g., the display module 160 in FIG. 1, the display module 260 in FIG. 2, the display 311 in FIG. 3, or the display 410 in FIG. 4). For example, the display may include a display that is at least partially transparent.

According to an example embodiment, in operation 1020, the electronic device may be connected to at least one external electronic device (e.g., the external electronic device 320 in FIG. 3 or the external electronic devices 520, 620, 720, 820, 920, and 940 in FIGS. 5 to 9) through a communication circuit (e.g., the communication module 190 in FIG. 1, the communication module 290 in FIG. 2, the communication circuit 314 in FIG. 3, or the communication circuit 440 in FIG. 4). For example, the electronic device may be connected to the at least one external electronic device through the wireless communication scheme (e.g., the Bluetooth, the WiFi, and the 5G communication scheme).

According to an example embodiment, in 1030 operation, the electronic device may display the at least one external electronic device through the display. For example, the electronic device may display the at least one external electronic device added in the augmented reality environment or the virtual reality environment on the display. As another example, when at least the portion of the display of the electronic device is transparent, the external electronic device may be viewed to the user of the electronic device through the transparent portion of the display. In various embodiments, the electronic device may provide the virtual reality environment by displaying the preview video filmed in the real space on the display.

According to an example embodiment, in operation 1040, the electronic device may specify the first external electronic device among the at least one external electronic device based on the input interface switching event.

In an example embodiment, the electronic device may recognize the input interface switching events including the first hand gesture of the user of positioning the user interface at the position where the first external electronic device is positioned in the augmented reality environment or the virtual reality environment and/or the second hand gesture of virtually clicking the first external electronic device. The electronic device may specify (or select) the first external electronic device among the at least one external electronic device based on the recognized interface switching event.

In an example embodiment, the electronic device may recognize the input interface switching event based on the gaze of the user staying (or remaining) for the time set on the first external electronic device among the at least one external electronic device in the augmented reality environment or the virtual reality environment. The electronic device may specify (or select) the first external electronic device among the at least one external electronic device when the gaze of the user stays (or remains) on the first external electronic device for the set time.

According to an example embodiment, in operation 1050, the operation of the electronic device may be controlled in the augmented reality environment or the virtual reality environment using the specified first external electronic device. For example, the electronic device may control the operation of the electronic device based on the user input received from the first external electronic device. For example, when the user input is received from the user on the touch screen (or the touch pad) included in the external electronic device, the electronic device may perform the operation (or the task) corresponding to the received user input. For example, when the user provides the scroll, the click, and/or the drag input to the touch screen included in the external electronic device, the electronic device may perform the scroll, the click, and/or the drag operation on the display of the electronic device in the augmented reality environment or the virtual reality environment.

Figure 11:
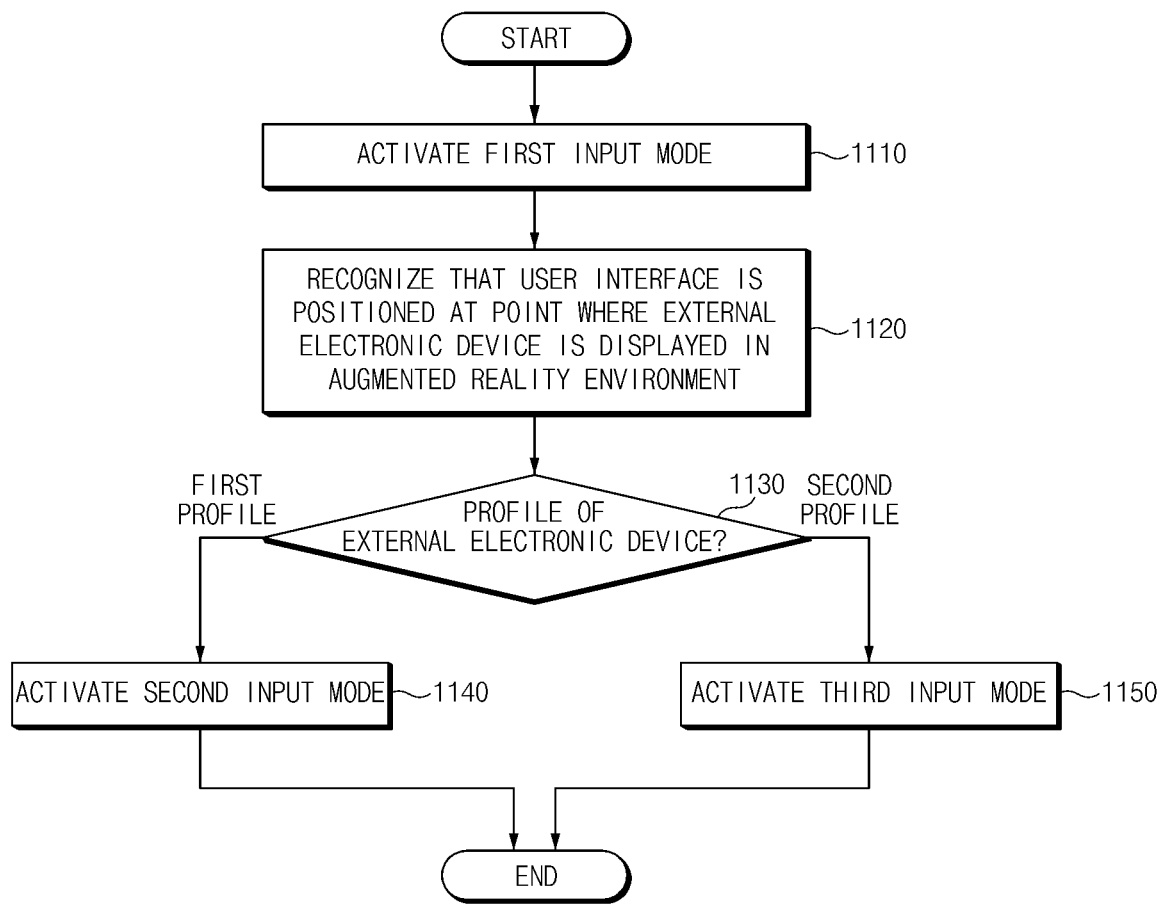
FIG. 11 is a flowchart of an operation method of an electronic device, according to various example embodiments.

FIG. 11 is a flowchart of an operation method of an electronic device, according to various embodiments.

According to an example embodiment, in 1110, an electronic device (e.g., the electronic device 101 in FIG. 1, the electronic device 201 in FIG. 2, the electronic device 310 in FIG. 3, the electronic device 400 in FIG. 4, the electronic device 500 in FIG. 5, the electronic device 600 in FIG. 6, the electronic device 700 in FIG. 7, the electronic device 800 in FIG. 8, or the electronic device 900 in FIG. 9) may activate the first input mode using the gesture of the user as the input scheme of the electronic device in the augmented reality environment and/or the virtual reality environment. For example, the gesture of the user may include the hand gesture of the user and/or the gaze of the user.

According to an example embodiment, in operation 1120, the electronic device may recognize that the user interface is positioned at the point where the external electronic device is displayed or viewed through the display (e.g., the display module 160 in FIG. 1, the display module 260 in FIG. 2, the display 311 in FIG. 3, or the display 410 in FIG. 4) in the augmented reality environment and/or the virtual reality environment. According to an example embodiment, the electronic device may specify (or select) the external electronic device when the user interface is positioned for the specified time. For example, the user interface may be the object moving along the hand gesture such that the user may visually recognize the hand gesture in the first input mode. In an example embodiment, after the user interface is positioned at the point where the external electronic device is displayed, the electronic device may further perform the operation of virtually clicking the external electronic device using the user interface.

According to an example embodiment, in operation 1130, the electronic device may recognize the profile of the external electronic device and/or the hardware component included in the external electronic device. According to an example embodiment, the electronic device may determine the profile of the specified (or selected) external electronic device and/or the hardware component of the external electronic device, and perform operation 1140 when the profile of the external electronic device corresponds to a first profile. For example, when the external electronic device is able to perform the relatively high-level data processing operation, the electronic device may perform operation 1140. According to an example embodiment, the electronic device may determine the profile of the specified (or selected) external electronic device, and perform operation 1150 when the profile of the external electronic device corresponds to a second profile. For example, when the external electronic device is able to perform a relatively low-level data processing operation, the electronic device may perform operation 1150.

According to an example embodiment, in operation 1140, the electronic device may activate the second input mode. According to an example embodiment, when the external electronic device is able to perform the relatively high-level data processing operation (e.g., the rendering, the encoding, the decoding, and/or the trans coding), the electronic device may activate the second input mode. For example, when the external electronic device corresponds to the smart phone, the electronic device may activate the second input mode. According to an example embodiment, the second input mode may correspond to the input mode for controlling the operation of the electronic device using the specified (or selected) external electronic device. For example, the electronic device may perform the various operations (e.g., the screen control operation or the data processing operation) in the augmented reality environment and/or the virtual reality environment based on the user input received on the specified (or selected) external electronic device.

According to an example embodiment, in operation 1150, the electronic device may activate the third input mode. According to an example embodiment, when the external electronic device is able to perform the relatively low-level data processing operation (e.g., the sensing of the user input and the transmission of the corresponding input signal), the electronic device may activate the third input mode. For example, when the external electronic device corresponds to the smart watch, the smart ring, and/or the Bluetooth earphone, the electronic device may activate the third input mode. According to an example embodiment, the third input mode may correspond to the input mode for controlling the operation of the electronic device using the hand gesture of the user as the input method of the electronic device, and providing the feedback (e.g., the vibration, the sound, and/or the light) of the operation of the electronic device to the user using the specified (or selected) external electronic device.

Figure 12:
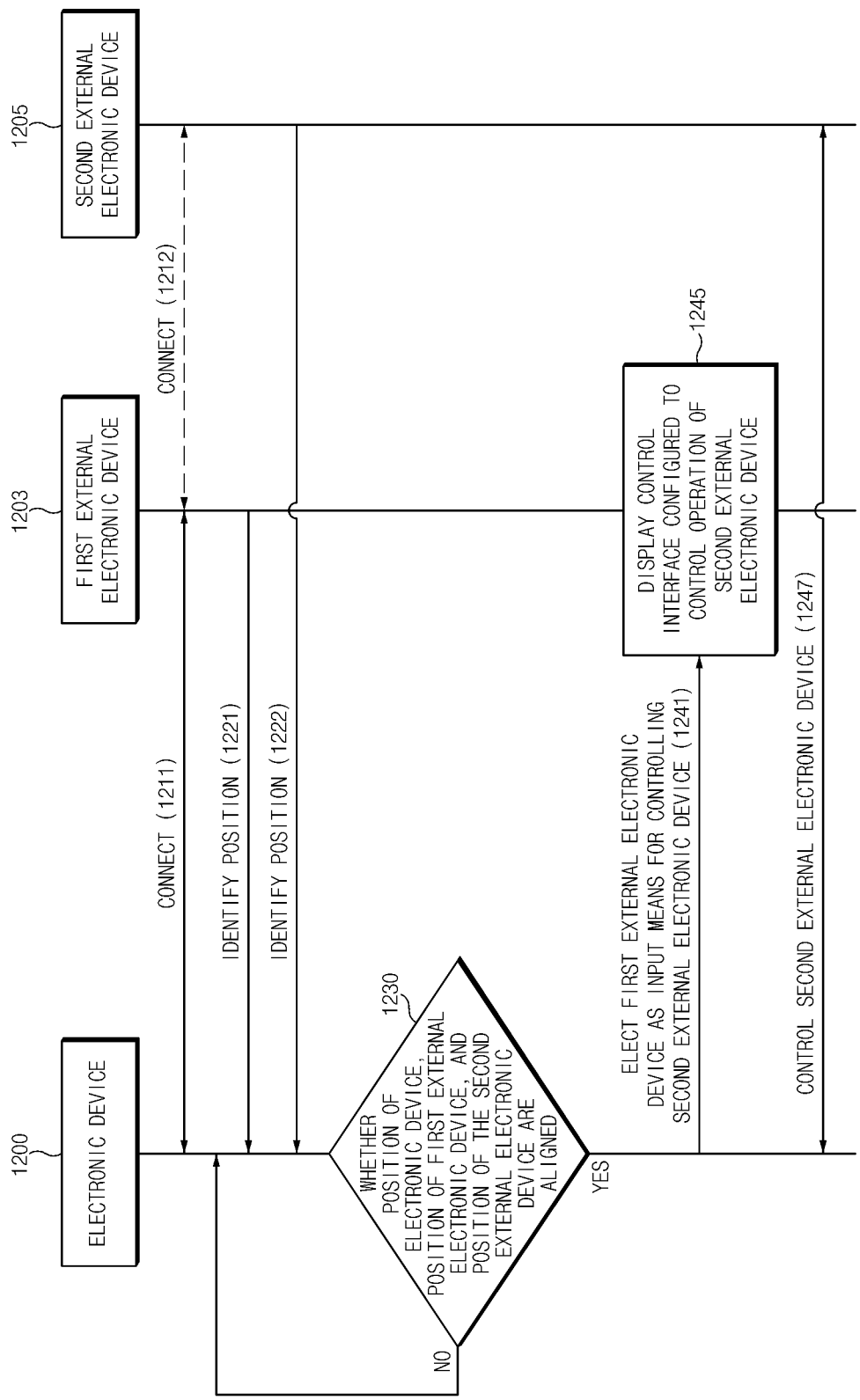
FIG. 12 is a flowchart of an operation method of an electronic device, according to various example embodiments.

FIG. 12 is a flowchart of an operation method of an electronic device, according to various embodiments.

According to an example embodiment, in operation 1211, an electronic device 1200 (e.g., the electronic device 101 in FIG. 1, the electronic device 201 in FIG. 2, the electronic device 310 in FIG. 3, the electronic device 400 in FIG. 4, the electronic device 500 in FIG. 5, the electronic device 600 in FIG. 6, the electronic device 700 in FIG. 7, the electronic device 800 in FIG. 8, or the electronic device 900 in FIG. 9) may be connected (or paired) with a first external electronic device 1203 and a second external electronic device 1205. For example, the first external electronic device 1203 may include the smartphone.

According to an example embodiment, in operation 1212, the first external electronic device 1203 may be connected (or paired) with the second external electronic device 1205. For example, the second external electronic device 1205 may include the IoT electronic device (e.g., the smart TV). In various embodiments, operation 1212 may be omitted. In this case, the first external electronic device 1203 and the second external electronic device 1205 may not directly connected to each other, but may be indirectly connected to each other through the electronic device 1200.

According to an example embodiment, in operation 1221, the electronic device 1200 may identify (or recognize) a position of the first external electronic device 1203 in the augmented reality environment and/or the virtual reality environment. For example, the electronic device 1200 may use a depth camera (e.g., the depth camera 215 in FIG. 2) to identify a point at which the first external electronic device 1203 is positioned in the augmented reality environment and/or the virtual reality environment.

According to an example embodiment, in operation 1222, the electronic device 1200 may identify (or recognize) a position of the second external electronic device 1205 in the augmented reality environment and/or the virtual reality environment. For example, the electronic device 1200 may use the depth camera (e.g., the depth camera 215 in FIG. 2) to identify a point at which the second external electronic device 1205 is positioned in the augmented reality environment and/or the virtual reality environment.

According to an example embodiment, in operation 1230, the electronic device 1200 may determine whether the position of the electronic device 1200, the position of the first external electronic device 1203, and the position of the second external electronic device 1205 are aligned (or alignment states of the positions of the electronic device 1200, the first external electronic device 1203, and the second external electronic device 1205) in the augmented reality environment and/or the virtual reality environment. According to an example embodiment, when the first external electronic device 1203 and the second external electronic device 1205 are positioned in a region corresponding to a gaze direction of a user of the electronic device 1200, the electronic device 1200 may determine that the position of the electronic device 1200, the position of the first external electronic device 1203, and the position of the second external electronic device 1205 are aligned, and perform operation 1241. In various embodiments, the electronic device 1200 may further determine whether a time the gaze of the user stays on the first external electronic device 1203 is equal to or greater than the set time. For example, when determining that the position of the electronic device 1200, the position of the first external electronic device 1203, and the position of the second external electronic device 1205 are aligned, and the time the gaze of the user stays on the first external electronic device 1203 is equal to or greater than the set time, the electronic device 1200 may perform operation 1241.

According to an example embodiment, when the position of the electronic device 1200, the position of the first external electronic device 1203, and the position of the second external electronic device 1205 are not aligned in the augmented reality environment and/or the virtual reality environment, the electronic device 1200 may perform operation 1221 and operation 1222 again.

According to an example embodiment, in operation 1241, the electronic device 1200 may select the first external electronic device 1203 as input method for controlling the second external electronic device 1205 in the augmented reality environment and/or the virtual reality environment.

According to an example embodiment, in operation 1245, the first external electronic device 1203 may display a control interface configured to control an operation of the second external electronic device 1205 on a display of the first external electronic device 1203. For example, when the second external electronic device 1205 is the smart TV, the first external electronic device 1203 may display a control interface configured to control on/off, a channel number, and/or a volume level of the second external electronic device 1205 on the display of the first external electronic device 1203.

According to an example embodiment, in operation 1247, in the augmented reality environment and/or the virtual reality environment, the electronic device 1200 may control the second external electronic device 1205. For example, in a state of wearing the electronic device 1200 on a head thereof, the user of the electronic device 1200 may input the user input (e.g., volume up) to the control interface related to the second external electronic device 1205 displayed on the first external electronic device 1203. The first external electronic device 1203 may provide a first control signal corresponding to the user input received through the control interface to the electronic device 1200. The electronic device 1200 may control the operation of the second external electronic device 1205 based on the received first control signal. For example, when the user wearing the electronic device 1200 inputs the user input instructing the volume up of the second external electronic device 1205 to the control interface displayed on the first external electronic device 1203, the first external electronic device 1203 may transmit the first control signal corresponding to the input user input to the electronic device 1200. The electronic device 1200 may provide a second control signal for setting the volume level of the second external electronic device 1205 to a large value to the second external electronic device 1205 based on the received first control signal.

According to an example embodiment, the electronic device 1200 may intuitively control operations of the plurality of external electronic devices 1203 and 1205 in the augmented reality environment and/or the virtual reality environment. For example, the electronic device 1200 may select one of the plurality of external electronic devices 1203 and 1205 as input method for controlling the other based on at least one of whether the plurality of external electronic devices 1203 and 1205 are aligned in the augmented reality environment and/or the virtual reality environment and/or the time the gaze of the user is stopped.

An operation method of an electronic device (e.g., the electronic device 101 in FIG. 1, the electronic device 201 in FIG. 2, the electronic device 310 in FIG. 3, the electronic device 400 in FIG. 4, the electronic device 500 in FIG. 5, the electronic device 600 in FIG. 6, the electronic device 700 in FIG. 7, the electronic device 800 in FIG. 8, or the electronic device 900 in FIG. 9) according to an embodiment of the disclosure includes an operation of providing an augmented reality (AR) environment or a virtual reality (VR) environment through a display (e.g., the display module 160 in FIG. 1, the display module 260 in FIG. 2, the display 311 in FIG. 3, or the display 410 in FIG. 4), an operation of being connected to at least one external electronic device (e.g., the external electronic device 320 in FIG. 3 or the external electronic devices 520, 620, 720, 820, 920, and 940 in FIGS. 5 to 9) through a communication circuit (e.g., the communication module 190 in FIG. 1, the communication module 290 in FIG. 2, the communication circuit 314 in FIG. 3, or the communication circuit 440 in FIG. 4), an operation of displaying the at least one external electronic device through the display, an operation of specifying a first external electronic device among the displayed at least one external electronic device based on an input interface switching event, and an operation of controlling an operation of the electronic device in the augmented reality environment or the virtual reality environment using the specified first external electronic device.

According to an example embodiment, the method may further include an operation of creating a user interface moving based on a movement of a hand gesture of a user recognized using a camera included in the electronic device in the augmented reality environment or the virtual reality environment, and the operation of specifying of the first external electronic device may include an operation of specifying the first external electronic device based on the input interface switching event including a first hand gesture of positioning the created user interface at a point where the first external electronic device is displayed, and a second hand gesture of virtually touching the first external electronic device using the user interface.

According to an example embodiment, the method may further include an operation of providing feedback related to the operation of the electronic device including at least one of vibration, sound, and light using at least one of a haptic module, an acoustic module, and a light emitting module when the first external electronic device includes at least one of the haptic module, the acoustic module, and the light emitting module.

According to an example embodiment, the operation of specifying of the first external electronic device may include an operation of specifying the first external electronic device based on the input interface switching event where the first external electronic device is positioned for a set time in a region corresponding to a gaze direction of a user recognized using a camera included in the electronic device.

According to an example embodiment, the method may further include an operation of recognizing a gaze direction of a user or a facing direction of a head of the user using a camera included in the electronic device, and an operation of assigning an authority to control an operation of a second external electronic device to the first external electronic device when the first external electronic device and the second external electronic device included in the at least one external electronic device are positioned for a set time in a region corresponding to the gaze direction of the user or the facing direction of the head of the user.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   a display;
   a communication circuit;
   at least one camera;
   a memory; and
   at least one processor operatively connected to the display, the communication circuit, the at least one camera, and the memory,
   wherein the memory stores instructions, and the at least one processor is configured to:
      provide at least one of an augmented reality (AR) environment or a virtual reality (VR) environment through the display;
      control to connect the electronic device and at least one external electronic device through the communication circuit;
      control to display the at least one external electronic device in at least one of the augmented reality environment or the virtual reality environment through the display;
      during a first input mode being activated, control a user interface in at least one of the augmented reality environment or the virtual reality environment based on a gesture of a user in the at least one of the augmented reality environment or the virtual reality environment detected by the at least one camera;
      detect an input interface switching event based on a gesture of the user to a point where the at least one external electronic device is displayed;
      specify a first external electronic device among the displayed at least one external electronic device corresponding to the detected input interface switching event; and
      based on detecting the input interface switching event, switch from the first input mode being activated to a second input mode or a third input mode being activated, wherein: in the second input mode, the user interface in at least one of the augmented reality environment or the virtual reality environment is controlled based on using the specified first external electronic device and, in the third input mode, the user interface in at least one of the augmented reality environment or the virtual reality environment is controlled based on using the specified first external electronic device and a gesture of the user detected by the at least one camera.

2. The electronic device of claim 1, wherein the at least one camera includes a first camera for recognizing a hand gesture of the user,
   wherein the instructions are configured to cause the at least one processor to create the user interface moving based on a movement of the hand gesture in at least one of the augmented reality environment or the virtual reality environment.

3. The electronic device of claim 2, wherein the instructions are configured to cause the at least one processor to specify the first external electronic device based on the input interface switching event including a first hand gesture of positioning the created user interface at the point where the first external electronic device is displayed, and a second hand gesture of virtually touching the first external electronic device using the user interface.

4. The electronic device of claim 2, wherein the instructions are configured to cause the at least one processor to move the user interface based on a movement of the first external electronic device in at least one of the augmented reality environment or the virtual reality environment.

5. The electronic device of claim 1, wherein the instructions are configured to cause the at least one processor to perform a scroll operation or a data input operation in at least one of the augmented reality environment or the virtual reality environment based on an input provided by a user through a touch screen when the first external electronic device includes the touch screen.

6. The electronic device of claim 1, wherein the instructions are configured to cause the at least one processor to provide feedback related to the operation of the electronic device including at least one of vibration, sound, and light using at least one of a haptic module, an acoustic module, and a light emitting module when the first external electronic device includes at least one of the haptic module, the acoustic module, and the light emitting module.

7. The electronic device of claim 1, wherein the at least one camera includes a second camera for recognizing a gaze direction of a user,
   wherein the instructions are configured to cause the at least one processor to specify the first external electronic device based on the input interface switching event where the first external electronic device is positioned for a set time in a region corresponding to the gaze direction of the user recognized by the second camera.

8. The electronic device of claim 7, wherein the instructions are configured to cause the at least one processor to move the user interface based on a movement of the first external electronic device in at least one of the augmented reality environment or the virtual reality environment.

9. An electronic device comprising:
   a display;
   a communication circuit;
   at least one camera;
   a memory; and
   at least one processor operatively connected to the display, the communication circuit, the at least one camera, and the memory,
   wherein the memory stores instructions, and the at least one processor is configured to:
      provide at least one of an augmented reality (AR) environment or a virtual reality (VR) environment through the display;
      control to connect the electronic device and at least one external electronic device through the communication circuit;
      control to display the at least one external electronic device through the display;
      specify a first external electronic device among the displayed at least one external electronic device based on at least an input interface switching event; and
      control an operation of the electronic device in at least one of the augmented reality environment or the virtual reality environment using the specified first external electronic device,
   wherein the at least one camera includes a second camera for recognizing a facing direction of a head of a user, and assign an authority to control an operation of a second external electronic device to the first external electronic device based on the first external electronic device and the second external electronic device included in the at least one external electronic device being positioned for a set time in a region corresponding to a gaze direction of the user or the facing direction of the head of the user recognized by the second camera.

10. The electronic device of claim 9, wherein the instructions are configured to cause the at least one processor to:
allow the first external electronic device to display a control interface for controlling the operation of the second external electronic device; and
provide feedback related to the operation of the second external electronic device including at least one of vibration, sound, and light using at least one of a haptic module, an acoustic module, and a light emitting module based on the first external electronic device including at least one of the haptic module, the acoustic module, and the light emitting module.

11. An electronic device comprising:
a display;
a communication circuit;
at least one camera;
a memory; and
at least one processor operatively connected to the display, the communication circuit, the at least one camera, and the memory,
wherein the memory stores instructions, and the at least one processor is configured to:
provide at least one of an augmented reality (AR) environment or a virtual reality (VR) environment through the display;
control to connect the electronic device and an external electronic device through the communication circuit;
control to display the external electronic device through the display;
activate a first input mode for controlling the electronic device using a hand gesture of a user while at least one of the augmented reality environment or the virtual reality environment is provided;
activate a second input mode for controlling the electronic device using the external electronic device based on reception of an input interface switching request provided by the user while the first input mode is activated and the external electronic device corresponds to a first type of device; and
activate a third input mode for controlling the electronic device using the hand gesture and the external electronic device based on reception of an input interface switching request provided by the user while the first input mode is activated and the external electronic device corresponds to a second type of device different from the first type of device.

12. The electronic device of claim 11, wherein the instructions are configured to cause the at least one processor to:
control to display a user interface indicating whether the first input mode is activated in at least one of the augmented reality environment or the virtual reality environment; and
activate the second input mode or the third input mode based on a hand gesture of the user of positioning the user interface on the external electronic device.

13. The electronic device of claim 11, wherein the instructions are configured to cause the at least one processor to:
recognize a gaze direction of the user or a facing direction of a head of the user using the at least one camera; and
activate the second input mode or the third input mode by recognizing that the external electronic device is positioned for a set time in a region corresponding to the gaze direction or the facing direction of the head.

14. The electronic device of claim 11, wherein the instructions are configured to cause the at least one processor to:
control to display a control interface supporting the second input mode and the third input mode on a display included in the external electronic device in response to the activation of the second input mode or the third input mode; and
perform a task corresponding to a user input based on the user input received through the control interface.

15. The electronic device of claim 14, wherein the task includes at least one of an operation of scrolling a screen displayed on the display and an operation of inputting data corresponding to the user input in at least one of the augmented reality environment or the virtual reality environment.

16. An operation method of an electronic device, the method comprising:
an operation of providing at least one of an augmented reality (AR) environment or a virtual reality (VR) environment through a display;
an operation of connecting the electronic device and at least one external electronic device through a communication circuit;
an operation of displaying the at least one external electronic device in at least one of the augmented reality environment or the virtual reality environment through the display;
an operation of controlling, during a first input mode being activated, a user interface in at least one of the augmented reality environment or the virtual reality environment based on a gesture of a user in the at least one of the augmented reality environment or the virtual reality environment detected by at least one camera;
an operation of detecting an input interface switching event based on a gesture of the user to a point where the at least one external electronic device is displayed;
an operation of specifying a first external electronic device among the displayed at least one external electronic device corresponding to the detected input interface switching event; and
an operation of, based on detecting the input interface switching event, switching from the first input mode being activated to a second input mode or a third input mode being activated, wherein: in the second input mode, the user interface in at least one of the augmented reality environment or the virtual reality environment is controlled based on using the specified first external electronic device and, in the third input mode, the user interface in at least one of the augmented reality environment or the virtual reality environment is controlled based on using the specified first external electronic device and a gesture of the user detected by the at least one camera.

17. The method of claim 16, further comprising:
an operation of creating the user interface moving based on a movement of a hand gesture of the user recognized using a camera included in the electronic device in at least one of the augmented reality environment or the virtual reality environment,
wherein the operation of specifying of the first external electronic device includes an operation of specifying the first external electronic device based on the input interface switching event including a first hand gesture of positioning the created user interface at a point where the first external electronic device is displayed, and a second hand gesture of virtually touching the first external electronic device using the user interface.

18. The method of claim 16, further comprising:
an operation of providing feedback related to the operation of the electronic device including at least one of vibration, sound, and light using at least one of a haptic module, an acoustic module, and a light emitting module based on the first external electronic device including at least one of the haptic module, the acoustic module, and the light emitting module.

19. The method of claim 16, wherein the operation of specifying of the first external electronic device includes an operation of specifying the first external electronic device based on the input interface switching event where the first external electronic device is positioned for a set time in a region corresponding to a gaze direction of a user recognized using a camera included in the electronic device.

20. An operation method of an electronic device, the method comprising:
an operation of providing at least one of an augmented reality (AR) environment or a virtual reality (VR) environment through a display;
an operation of connecting the electronic device and at least one external electronic device through a communication circuit;
an operation of displaying the at least one external electronic device through the display;
an operation of specifying a first external electronic device among the displayed at least one external electronic device based on an at least input interface switching event;
an operation of controlling an operation of the electronic device in at least one of the augmented reality environment or the virtual reality environment using the specified first external electronic device;
an operation of recognizing a gaze direction of a user or a facing direction of a head of the user using a camera included in the electronic device; and
an operation of assigning an authority to control an operation of a second external electronic device to the first external electronic device when the first external electronic device and the second external electronic device included in the at least one external electronic device are positioned for a set time in a region corresponding to the gaze direction of the user or the facing direction of the head of the user.

* * * * *